United States Patent
Loveness et al.

(10) Patent No.: US 10,096,817 B2
(45) Date of Patent: Oct. 9, 2018

(54) TEMPLATE ELECTRODE STRUCTURES WITH ENHANCED ADHESION CHARACTERISTICS

(75) Inventors: Ghyrn E. Loveness, Mountain View, CA (US); Song Han, Foster City, CA (US); Zuqin Liu, Sunnyvale, CA (US)

(73) Assignee: Amprius, Inc., Sunnyvale, CA (US)

( * ) Notice: Subject to any disclaimer, the term of this patent is extended or adjusted under 35 U.S.C. 154(b) by 1341 days.

(21) Appl. No.: 13/540,484

(22) Filed: Jul. 2, 2012

(65) Prior Publication Data

US 2013/0011736 A1  Jan. 10, 2013
US 2017/0098819 A9  Apr. 6, 2017

Related U.S. Application Data

(63) Continuation-in-part of application No. 13/039,031, filed on Mar. 2, 2011, now Pat. No. 8,257,866, which is a continuation-in-part of application No. 12/437,529, filed on May 7, 2009.

(60) Provisional application No. 61/503,819, filed on Jul. 1, 2011, provisional application No. 61/310,183, filed on Mar. 3, 2010.

(51) Int. Cl.
| | |
|---|---|
| H01M 4/62 | (2006.01) |
| H01M 4/04 | (2006.01) |
| H01M 4/02 | (2006.01) |
| H01M 4/38 | (2006.01) |
| H01M 4/583 | (2010.01) |
| H01M 4/13 | (2010.01) |
| H01M 4/139 | (2010.01) |
| H01M 4/36 | (2006.01) |
| H01M 4/66 | (2006.01) |
| H01M 4/70 | (2006.01) |
| H01M 4/134 | (2010.01) |
| H01M 4/75 | (2006.01) |

(52) U.S. Cl.
CPC ........... *H01M 4/13* (2013.01); *H01M 4/0492* (2013.01); *H01M 4/134* (2013.01); *H01M 4/139* (2013.01); *H01M 4/366* (2013.01); *H01M 4/624* (2013.01); *H01M 4/628* (2013.01); *H01M 4/665* (2013.01); *H01M 4/70* (2013.01); *H01M 4/75* (2013.01); *H01M 2004/022* (2013.01)

(58) Field of Classification Search
CPC ...................................................... H01M 4/75
See application file for complete search history.

(56) References Cited

U.S. PATENT DOCUMENTS

| | | |
|---|---|---|
| 4,366,215 A | 12/1982 | Coetzer et al. |
| 4,436,796 A | 3/1984 | Huggins et al. |
| 5,457,343 A | 10/1995 | Ajayan |
| 5,997,832 A | 12/1999 | Lieber |
| 6,004,695 A | 12/1999 | Goda et al. |
| 6,083,644 A | 7/2000 | Watanabe et al. |
| 6,090,505 A | 7/2000 | Shimamura et al. |
| 6,334,939 B1 | 1/2002 | Zhou |
| 6,423,453 B1 | 7/2002 | Noda |
| 6,514,395 B2 | 2/2003 | Zhou |
| 7,402,829 B2 | 7/2008 | Green |
| 7,408,829 B2 | 8/2008 | Kuang et al. |
| 7,816,031 B2 | 10/2010 | Cul et al. |
| 8,257,866 B2 | 9/2012 | Loveness et al. |
| 8,491,718 B2 | 7/2013 | Chaudhari |
| 8,556,996 B2 | 10/2013 | Loveness et al. |
| 8,877,374 B2 | 11/2014 | Cui et al. |
| 9,172,088 B2 | 10/2015 | Loveness et al. |
| 9,172,094 B2 | 10/2015 | Loveness et al. |
| 9,780,365 B2 | 10/2017 | Liu et al. |
| 2002/0028384 A1 | 3/2002 | Krasnov et al. |
| 2002/0072577 A1 | 6/2002 | Jacobsen et al. |
| 2002/0102461 A1 | 8/2002 | Baker et al. |
| 2002/0148727 A1 | 10/2002 | Zhou et al. |
| 2003/0175589 A1 | 9/2003 | Kaminaka et al. |
| 2003/0178104 A1 | 9/2003 | Sekine |
| 2003/0203139 A1 | 10/2003 | Ren et al. |
| 2004/0023111 A1 | 2/2004 | Ohshita et al. |
| 2004/0063839 A1 | 4/2004 | Kawate et al. |
| 2004/0126659 A1 | 7/2004 | Graetz |
| 2005/0153208 A1 | 7/2005 | Konishiike et al. |
| 2005/0167655 A1 | 8/2005 | Furukawa et al. |
| 2005/0175901 A1 | 8/2005 | Kawakami et al. |
| 2005/0238810 A1 | 10/2005 | Scaringe et al. |
| 2005/0279274 A1 | 12/2005 | Nui et al. |

(Continued)

FOREIGN PATENT DOCUMENTS

| | | |
|---|---|---|
| CN | 1705148 | 12/2005 |
| CN | 1705418 A | 12/2005 |
| CN | 1979828 A | 6/2007 |
| CN | 101010780 | 8/2007 |
| CN | 101560694 | 10/2009 |

(Continued)

OTHER PUBLICATIONS

Aifantis et al., "High energy density lithium batteries", 2010 Wiley-VCH Verlag GmbH & Co. KGaA, Weinheim (Chapter 6: Next-generation anodes for secondary Li-Ion batteries) ISBN: 978-3-527-32407-1.

(Continued)

*Primary Examiner* — Ladan Mohaddes
(74) *Attorney, Agent, or Firm* — Weaver Austin Villeneuve & Sampson LLP

(57) ABSTRACT

Provided herein are novel template electrode materials and structures for lithium ion cells. Related methods are also provided. According to various embodiments, an electrode can include a nanostructured template, an electrochemically active material layer coating the template, and a first intermediate layer between the nanostructured template and the electrochemically active material layer. In one arrangement, the nanostructured template includes silicide nanowires. The electrochemically active material may be any of silicon, tin, germanium, carbon, metal hydrides, silicides, phosphides, and nitrides. The first intermediate layer may facilitate adhesion between the nanostructured template and the electrochemically active material layer, electronic conductivity within the electrode, and/or stress relaxation between the nanostructured template and the electrochemically active material layer.

20 Claims, 14 Drawing Sheets

(56) References Cited

U.S. PATENT DOCUMENTS

| | | |
|---|---|---|
| 2006/0040182 A1 | 2/2006 | Kawakami et al. |
| 2006/0097691 A1 | 5/2006 | Green |
| 2006/0154141 A1 | 7/2006 | Salot et al. |
| 2006/0165988 A1 | 7/2006 | Chiang et al. |
| 2006/0216603 A1 | 9/2006 | Choi |
| 2006/0258133 A1 | 11/2006 | Georgiev et al. |
| 2007/0065720 A1 | 3/2007 | Hasegawa et al. |
| 2007/0095276 A1 | 5/2007 | Sunkara et al. |
| 2007/0148544 A1 | 6/2007 | Le |
| 2007/0154808 A1 | 7/2007 | Konishiike et al. |
| 2008/0008844 A1 | 1/2008 | Bettge et al. |
| 2008/0044732 A1 | 2/2008 | Salot et al. |
| 2008/0110486 A1 | 5/2008 | Tsakalokos et al. |
| 2008/0145762 A1 | 6/2008 | Adachi et al. |
| 2008/0213603 A1 | 9/2008 | Kobayashi et al. |
| 2008/0261096 A1 | 10/2008 | Kollman et al. |
| 2008/0274403 A1 | 11/2008 | Kim et al. |
| 2008/0280169 A1 | 11/2008 | Niu et al. |
| 2008/0280207 A1 | 11/2008 | Patoux et al. |
| 2009/0042102 A1 | 2/2009 | Cui et al. |
| 2009/0061319 A1 | 3/2009 | Kim et al. |
| 2009/0068553 A1 | 3/2009 | Firsich et al. |
| 2009/0169996 A1 | 7/2009 | Zhamu et al. |
| 2009/0176159 A1 | 7/2009 | Zhamu et al. |
| 2009/0214944 A1 | 8/2009 | Rojeski |
| 2009/0246628 A1 | 10/2009 | Adachi et al. |
| 2009/0269511 A1 | 10/2009 | Zhamu et al. |
| 2009/0291371 A1 | 11/2009 | Konishiike et al. |
| 2009/0305131 A1 | 12/2009 | Kumar et al. |
| 2009/0316335 A1 | 12/2009 | Simon et al. |
| 2010/0043877 A1 | 2/2010 | Wang et al. |
| 2010/0122725 A1 | 5/2010 | Buchine et al. |
| 2010/0159337 A1 | 6/2010 | Matsumoto et al. |
| 2010/0209775 A1 | 8/2010 | Kim et al. |
| 2010/0237272 A1 | 9/2010 | Chaudhari |
| 2010/0285358 A1 | 11/2010 | Cui et al. |
| 2010/0310941 A1 | 12/2010 | Kumta et al. |
| 2010/0330421 A1 | 12/2010 | Cui et al. |
| 2010/0330423 A1 | 12/2010 | Cui et al. |
| 2011/0027655 A1 | 2/2011 | Rojeski |
| 2011/0111294 A1 | 5/2011 | Lopez et al. |
| 2011/0111300 A1 | 5/2011 | DelHagen et al. |
| 2011/0111304 A1 | 5/2011 | Cui et al. |
| 2011/0143019 A1 | 6/2011 | Mosso et al. |
| 2011/0143263 A1 | 6/2011 | Shirvanian et al. |
| 2011/0159365 A1 | 6/2011 | Loveness et al. |
| 2011/0159367 A1 | 6/2011 | Kim et al. |
| 2011/0189510 A1 | 8/2011 | Caracciolo et al. |
| 2011/0287318 A1 | 11/2011 | Loveness et al. |
| 2012/0034524 A1 | 2/2012 | Caracciolo et al. |
| 2012/0070741 A1 | 3/2012 | Liu et al. |
| 2012/0094192 A1 | 4/2012 | Jun et al. |
| 2012/0183856 A1 | 7/2012 | Cui et al. |
| 2012/0292586 A1 | 11/2012 | Yamauchi et al. |
| 2012/0301785 A1 | 11/2012 | Buchine et al. |
| 2012/0301789 A1 | 11/2012 | Loveness et al. |
| 2013/0284258 A1 | 10/2013 | Chaudhari |
| 2013/0344383 A1 | 12/2013 | Loveness et al. |
| 2015/0325852 A1 | 11/2015 | Wang et al. |
| 2016/0013483 A1 | 1/2016 | Loveness et al. |
| 2017/0098819 A9 | 4/2017 | Loveness et al. |

FOREIGN PATENT DOCUMENTS

| | | |
|---|---|---|
| CN | 101561694 A | 10/2009 |
| CN | 101953014 | 1/2011 |
| CN | 102460782 | 5/2012 |
| CN | 1476645 A | 2/2014 |
| EP | 845828 | 10/2002 |
| EP | 1494302 | 1/2005 |
| FR | 2880198 | 6/2006 |
| GB | 2470056 | 11/2010 |
| JP | 2007-061945 | 3/2007 |
| JP | 2008-026595 | 2/2008 |
| JP | 2008-192594 | 8/2008 |
| JP | 2008-269827 | 11/2008 |
| JP | 2008-305781 | 12/2008 |
| JP | 2009-021226 | 1/2009 |
| JP | 2013-521621 | 6/2013 |
| JP | 2012556203 | 6/2013 |
| WO | 2006/123049 | 11/2006 |
| WO | 2007/083152 | 1/2007 |
| WO | 2007/071778 | 6/2007 |
| WO | 2007/083155 | 2/2008 |
| WO | 2008/139157 | 11/2008 |
| WO | 2009/010757 | 1/2009 |
| WO | 2009/010758 | 1/2009 |
| WO | 2009/010759 | 1/2009 |
| WO | 2009/129490 | 10/2009 |
| WO | 2010/100599 | 9/2010 |
| WO | 2010/129910 | 11/2010 |
| WO | 2010/138617 | 12/2010 |
| WO | 2010/138619 | 12/2010 |
| WO | 2011/015174 | 2/2011 |
| WO | 2011/053553 | 5/2011 |
| WO | 2011/056847 | 5/2011 |
| WO | 2011/066818 | 6/2011 |
| WO | 2011/094642 | 8/2011 |
| WO | 2011/109477 | 9/2011 |
| WO | 2011/149958 | 12/2011 |
| WO | 2012/027360 | 3/2012 |
| WO | 2012/054767 | 4/2012 |

OTHER PUBLICATIONS

Kasavajjula et al., "Nano- and bulk-silicon-based insertion anodes for lithium-ion secondary cells", Journal of Power Sources 163 (2007) 1003-1039.

U.S. Appl. No. 12/437,529, Office Action dated May 13, 2011.

U.S. Appl. No. 12/437,529, Office Action dated Oct. 20, 2011.

U.S. Appl. No. 12/437,529, Office Action dated Dec. 22, 2011.

Cui, Yi et al., "Doping and electrical transport in silicon nanowires", The Journal of Physical Chemistry, vol. 104, No. 22, Jun. 8, 2000.

WO patent application No. PCT/US2010/036235, International Search Report and Written Opinion dated Jan. 28, 2001.

WO patent application No. PCT/US2011/026816, International Search Report and Written Opinion dated Oct. 18, 2011.

WO patent application No. PCT/US2010/036237, International Search Report and Written Opinion dated Feb. 1, 2011.

Cui, Li-Feng et al., "Crystalline-amorphous core-shell silicon nanowires for high capacity and high current battery electrodes," Nano Letters, 2009, vol. 9, No. 1 491-495, Dec. 23, 2008.

Kim, Cheol-Joo et al., "Spontaneous chemical vapor growth of NiSi nanowires and their metallic properties," Advanced Materials, 2007, 19, 3637-3642, Oct. 16, 2007.

Chan, Candace K. et al., "Surface chemistry and morphology of the solid electrolyte interphase on silicon nanowire lithium-ion battery anodes," Journal of Power Sources 189 (2009) 1132-1140.

Cui, Li-Feng et al., "Carbon-silicon core-shell nanowires as high capacity electrode for lithium ion batteries," Nano Letters, published on Aug. 5, 2009 on http://pubs.acs.org.

Esmanski, Alexei et al., "Silicon inverse-opal-based macroporous materials as negative electrodes for lithium ion batteries," Advanced Functional Materials, 2009, 1999-2010, May 7, 2009.

Park, Mi-Hee et al., "Silicon nanotube battery anodes," Nano Letters 2009, vol. 9, No. 11 3844 3847, Sep. 11, 2009.

Park, Mi-Hee et al., "Supporting information for silicon nanotube battery anodes," Sep. 11, 2009.

Kim, Hyunjung et al., "Three-dimensional porous silicon particles for use in high-performance lithium secondary batteries," Angewandte Chemie, Int. Ed. 2008, 47, 10151-10154, Nov. 17, 2008.

For high-performance anode material in lithium-ion batteries, After Gutenberg, downloaded from http://jcwinnie.biz/wordpress/?p=2864 on Dec. 25, 2009.

Magasinki, A. et al., "High-performance lithium-ion anodes using a hierarchical bottom-up approach," Nature Materials, published online at www.nature.com/naturematerials Mar. 14, 2010.

Kang, Kubum et al., "The role of NiOx overlayers on spontaneous growth of NiSix nanowires from Ni seed layers," Nano Letters 2008, vol. 8, No. 2 431-436, Jan. 12, 2008.

(56) References Cited

OTHER PUBLICATIONS

Kang, Kibum et al., Unconventional roles of metal catalysts in chemical-vapor syntheses of singel-crystalline nanowires,: Journal of Applied Physics 105, 122407 (2009).
Zhang, Hong-Li et al., "The facile synthesis of nickel silicide nanobelts and nanosheets and their application in electrochemical energy sotrage," Nanotechnology 19 (2008) 165606, (7 pp), Mar. 20, 2008.
Chan et al., "High-performance lithium battery anodes using silicon nanowires," Nature Nanotechnology, vol. 3, Jan. 2008.
WO patent application No. PCT/US2010/034106, International Search Report and Written Opinion dated Feb. 7, 2011.
U.S. Appl. No. 11/837,291, Office Action dated Feb. 18, 2009.
U.S. Appl. No. 11/837,291, Office Action dated Oct. 26, 2009.
U.S. Appl. No. 11/837,291, Office Action dated Jan. 7, 2010.
U.S. Appl. No. 11/837,291, Office Action dated Apr. 22, 2010.
U.S. Appl. No. 11/837,291, Notice of Allowance dated Aug. 10, 2010.
U.S. Appl. No. 12/895,424, Office Action dated Nov. 17, 2010.
Ying et al., "Characterization of SnO2 nanowires as anode materials for Li-ion batteries." Applied Physics Letters 87(11), 2005 (Abstract only).
Sharma et al., "Structural characteristics and connection mechanism of gold-catalyzed bridging silicon nanowires," Journal of Crystal Growth 280 (2005) 562-568.
Levitt, "Whisker Technology." Wiley Interscience, 1970.
Li et al., "Rate capabilities of nanostructured LiMn2O4 electrodes in aqueous electrolyte." J. Electrochem. Soc. 147, 2044-2049 (2000).
Sharma et al., "Thermodynamic properties of the lithium-silicon system." Journal of the Electrochemical Society 123, 1763-1768 (Dec. 1976).
Givargizov, "Fundamental aspects of VLS growth," Journal of Crystal Growth 31, 20-30 (1975).
Goldstein et al., "Melting in semiconductor nanocrystals," Science 256, 1425-1427 (Jun. 1992).
Li et al., "A high capacity nano-Si composite anode material for lithium rechargeable batteries," Electrochemical and Solid-State Letters, 2 (11) 547-549 (1999).
Uehara et al., "Thick vacuum deposited silicon films suitable for the anode of Li-ion battery," Journal of Power Sources 146, 441-444 (2005).
Westwater et al., "Growth of silicon nanowires via gold/silane vapor-liquid-solid reaction," Journal Va. Sci. Technology B 15(3), 554-557 (May/Jun. 1997).
Yazawa et al., "Effect of one monolayer of surface gold atoms on the epitaxial growth of InAs nanowhiskers," Appl. Phys. Lett. 61 (17), 2051-2053 (Oct. 1992).
EP patent application No. 08831531.2, European Search Report dated Oct. 27, 2010.
Li et al., "Freestanding mesoporous quasi-single-crystalline Co3O4 nanowire arrays," J. Am. Chem. Soc. 2006, 128, 14258-14259, Oct. 18, 2006.
Sharma et al., "Diameter control of Ti-catalyzed silicon nanowires," Journal of Crystal Growth 267 (2004) 613-618, Apr. 20, 2004.
Pan et al., Nanobelts of Semiconduction Oxides, Science Mar. 9, 2001: 1947-1949.
Huang et al., Catalytic Growth of Zinc Oxide Nanowires by Vapor Transport, Adv. Mater., 13, 113-116 (2001).
Morales, et al., A Laser Ablation Method for the Synthesis of Crystalline Semiconductor Nanowires, Science vol. 279, Jan. 9, 1998.
Dick, et al A New Understanding of Au-Assisted Growth of Ill-V Semiconductor Nanowires, Adv. Funct. Mater. 15, 1603-1610 (2005).
Chan, C.K., et al., "High Capacity Li Ion Battery Anodes Using Ge Nanowires", Nano Letters, 2008, vol. 8, No. 1, 307-309.
Che, G., et al., "Carbon Nanotubule Membranes for Electrochemical Energy Storage and Production". Nature 393, 346-349 (1998).
Park, M.S. et al., "Preparation and Electrochemical Properties of SnO2 Nanowires for Application in Lithium-ion Batteries" Angew. Chem. Int. Edn 46, 750-753 (2007).

Huggins, R.A. & Nix, W.D. Decrepitation Model for Capacity Loss During Cycling of Alloys in Rechargeable Electrochemical Systems, Ionics 6, 57-63 (2000).
Lee, Y.M., et al. SEI layer formation on amorphous Si thin electrode during precycling. J. Electrochem. Soc. 154, A515-A519 (2007).
Green, M., et al Structured silicon anodes for lithium battery applications. Electrochem. Solid State Lett. 6, A75-A79 (2003).
Ryu, J.H., et al Failure modes of silicon powder negative electrode in lithium secondary batteries. Electrochem. Solid-State Lett. 7, A306-A309 (2004).
Gao, et al., "Alloy formation in nanostructured silicon." Adv. Mater. 13, 816-819 (2001).
Wang, Y., et al. Epitaxial growth of silicon nanowires using an aluminum catalyst. Nature Naotech. 1, 186-189 (2006).
Wu, Y. et al. Controlled growth and structures of molecular-scale silicon nanowires. Nao Lett. 4, 433-436 (2004).
Zhou, Controlled Li Doping of Si Nanowires (Applied Physics Letters vol. 75, No. 16), Oct. 18, 1999.
Carbon nanofiber product sheet, Applied Science 2008, downloaded from http://www.apsci.com/ngm-pyrol.html on May 2011.
U.S. Appl. No. 13/427,681, "Electrode including nanostructures for rechargeable cells," Cui et al., filed Mar. 22, 2012.
WO patent application No. PCT/US2011/037767, International Search Report and Written Opinion dated Jan. 16, 2012.
WO patent application No. PCT/US2011/057159, International Search Report and Written Opinion dated Jun. 11, 2012.
Zhang, et al., "Pyrolytic Carbon-coated Silicon/Carbon Nanotube Composites: Promising Application for Li-ion Batteries," Int. J. Nanomanufacturing, vol. 2, Nos. 1/2, 2008, pp. 4-15.
Office Action dated Apr. 5, 2012 for U.S. Appl. No. 13/039,031.
Notice of allowance dated Jul. 26, 2012 for U.S. Appl. No. 13/039,031.
"Sweet nanotech batteries: Nanotechnology could solve lithium battery charging problems," PhysOrg.com, Received online Mar. 23, 2012 from http://phys.org/news127043619.html.
Lee et al., "Anomalous growth and characterization of carbon-coated nickel silicide nanowires," Chemical Physics Letters 384, 2004, pp. 215-218.
U.S. Appl. No. 13/564,324, titled Template Electrode Structures for Depositing Action Materials, filed Aug. 1, 2012.
U.S. Office Action dated Sep. 17, 2012 issued in U.S. Appl. No. 13/540,484.
Quasi-2D Structures Make Better Batteries, Tyrell, James, Apr. 17, 2008, pp. 1-2.
Nickel Silicide Nanobelts and Sheets in Li-ion Anodes Capacity, Green Car Congress, Apr. 19, 2009, pp. 1-3.
U.S. Office Action dated Oct. 25, 2012 issued in U.S. Appl. No. 13/427,681.
Marczak et al., "The individual core/shell silicon nanowire structure probed by Raman spetroscopy," Raman Spetroscopy, Phys. Status Solidi C 6 No. 9, 2053-2055, 2009.
Campbell et al., "Preparation of mesoporous silica templated metal nanowire films on foamed nickel substrates," Microporous and Mesoporous Materials 97, 2006, 114-121.
TW patent publication No. 201238125, published Sep. 16, 2012, English Abstract.
U.S. Appl. No. 13/540,484, Notice of Allowance dated Feb. 22, 2013.
U.S. Appl. No. 13/914,491, "Template electrode structures for depositing active materials," filed Jun. 10, 2013, Loveness et al.
U.S. Appl. No. 13/277,821, Office Action dated Feb. 25, 2013.
U.S. Appl. No. 13/427,681, Final Office Action dated Jun. 11, 2013.
WO patent application No. PCT/US2012/045313, International Search Report and Written Opinion dated Jan. 21, 2013.
Park, Mi-Hee et al., "Silicon nanotube battery anodes," Nano Letters 2009, vol. 9, No. 11 3844 3847, Sep. 11, 2009.
Chan, Candace K. et al., "Structural and electrochemical study of the reaction of lithium with silicon nanowires," Journal of Power Sources 189 (2009) 34-39.
U.S. Appl. No. 13/277,821, Office Action dated Oct. 11, 2013.
Chaudhari, P. et al. "Heteroepitaxial silicon film growth at 600 degree C for an Al—Si cutectic melt," Thin Solid Films 518 (2010) 5368-5371.
U.S. Appl. No. 13/427,681, Office Action dated Oct. 2, 2013.

(56) References Cited

OTHER PUBLICATIONS

EP patent application No. 08831531.2, Supplemental European Search Report dated Jul. 4, 2013.
JP patent application No. 2012-510025, Notice of Reasons for Rejection dated Jan. 7, 2014.
Pre-Issuance Submission by Third Party dated Jan. 15, 2014, received in U.S. Appl. No. 13/914,491.
Pre-Issuance Submission by Third Party dated Jan. 21, 2014, received in U.S. Appl. No. 13/540,484.
U.S. Appl. No. 13/427,681, Office Action dated May 21, 2014.
U.S. Appl. No. 13/277,821, Office Action dated Apr. 10, 2014.
International Search Report and Written Opinion issued in Application No. PCT/US2010/056154 dated Jul. 22, 2011.
Chan, Candace et al., "High-performance lithium battery anodes using silicon nanowires," Nature nanotechnology, vol. 3, Jan. 2008, published online Dec. 16, 2007.
U.S. Office Action dated Jan. 31, 2014, issued in U.S. Appl. No. 13/340,484.
Pre-Issuance Submission by Third Party dated Jan. 13, 2014, received in U.S. Appl. No. 12/944,576.
Pre-Issuance Submission by Third Party dated Jan. 15, 2014, received in U.S. Appl. No. 12/944,576.
Chinese Office Action dated Apr. 2, 2014, issued in Application No. 201080056933.2.
Chaudhari, P. et al., Heteroepitaxial Silicon Film Growth at 600C From An Al—Si Eutectic Melt, pp. 5368-5371, Mar. 19, 2010, Thin Solid Films 518, Elsevier, US.
CN Office Action dated Apr. 2, 2014, issued in Application No. 201080056933.2.
EP Search Report issued in Application No. 12807729.4 dated Feb. 5, 2015.
CN Office Action dated Dec. 23, 2014, issued in Application No. 201080056933.2.
U.S. Appl. No. 13/114,413, Office Action dated Jun. 19, 2014.
JP patent application No. 2012-556203, Office Action dated Aug. 26, 2014.
CN patent application No. 201180019460.3, Office Action dated Jul. 2, 2014.
JP patent application No. 2012-510025, Decision of Rejection dated Aug. 5, 2014.
CN patent application No. 201080026302.6, Office Action dated Aug. 8, 2014.
JP patent application No. 2013-501400, Decision of Rejection dated Aug. 19, 2014.
CN patent application No. 201180022062.7, Office Action dated Aug. 25, 2014.
U.S. Appl. No. 13/277,821, Final Office Action dated Nov. 20, 2014.
CN patent application No. 201080026302.6, Office Action dated Oct. 23, 2013.
U.S. Appl. No. 13/914,491, Office Action dated Dec. 3, 2014.
U.S. Appl. No. 13/427,681, Office Action dated Feb. 6, 2015.
U.S. Appl. No. 13/114,413, Notice to Allowance dated Jan. 22, 2015.
CN patent application No. 201080026302.6, Office Action dated Mar. 23, 2015.
TW patent application No. 100120247, Office Action dated Feb. 9, 2015.
U.S. Appl. No. 13/914,491, Notice of Allowance dated Jul. 19, 2015.
US patent application titled "Template Electrode Structures for Depositing Active Materials" U.S. Appl. No. 14/859,125, filed Sep. 18, 2015.
TW Office Action issue in Application No. 100138369, dated Dec. 22, 2015.
U.S. Appl. No. 13/277,821, Decision on Appeal dated Oct. 18, 2016.
U.S. Appl. No. 13/277,821, Notice of Allowance dated Jan. 4, 2017.
International Search report and Written Opinion dated Aug. 10, 2015, issued in Application No. PCT/US15/30336.
Huang et al., Fabrication of Silicon Nanowire Arrays with Controlled Diameter, Length, and Density, Adv. Mater., (2007), 19, 744-748.
Examiner's Answer, dated Sep. 28, 2016, issued in U.S. Appl. No. 13/427,681.
CN Office Action issued in application No. 201280038037.2, dated May 26, 2016.
JP Office Action issued in application No. 2014-519238, dated May 31, 2016.
CN patent application No. 11751259.0, Office Action dated Dec. 12, 2016.
EP Search Report issued in Application No. 12807729.4 dated Jan. 11, 2017.
Sun et al, Synthesis of Nickel Mono-Silicide Nanowire by Chemical Vapor Deposition on Nickel Film: Role of Surface Nickel Oxides, Japanese Journal of Applied Physics, vol. 48, No. 4, Apr. 1, 2009, p. 84C138, XP855323364.
U.S. Appl. No. 13/114,413, Notice of Allowance dated Jun. 24, 2015.
CN patent application No. 11751259.0, Extended Search Report dated Mar. 16, 2017.
CN patent application No. 201510674597.2, Office Action and Search Report dated Mar. 28, 2017.
JP patent application No. 2016-077671, Office Action dated Jul. 4, 2017.
U.S. Appl. No. 14/710,103, Office Action dated May 22, 2017.
U.S. Appl. No. 13/277,821, Notice of Allowance dated Jun. 1, 2017.
KR patent application No. 10-2012-7024928 , Office Action dated Aug. 28, 2017.
Board of Appeal Decision, dated Nov. 15, 2017, issued in U.S. Appl. No. 13/427,681.
IL patent application No. 216100, Office Action (Notification of Deficiencies Prior to Allowance of Patent Application) dated Jun. 22, 2016.
Zhang, et al., "The facile synthesis of nickel silicide nanobelts and nanosheets and their application in electrochemical energy storage," Nanotechnology vol. 19, No. 165606, 2008, pp. 1-7.
U.S. Appl. No. 14/710,103, Notice of Allowance dated Oct. 27, 2017.
U.S. Office Action dated Oct. 16, 2017, issued in U.S. Appl. No. 13/340,484.
U.S. Appl. No. 15/694,470, filed Sep. 1, 2017, Liu et al.
CN Office Action issued in Application No. 201280038037.2 dated Aug. 5, 2015.
EP Search Report issued in Application No. 12807729.4 dated Jun. 2, 2015.
U.S. Office Action dated Sep. 17, 2015, issued in U.S. Appl. No. 13/340,484.
CN Office Action dated Jul. 29, 2015, issued in Application No. 201080056933.2.
U.S. Final Office Action dated Apr. 27, 2016, issued in U.S. Appl. No. 13/340,484.
CN Office Action issued in Application No. 2014-519238 dated May 31, 2016.
CN patent application No. 201180019460.3, Office Action dated May 6, 2015.
U.S. Appl. No. 14/710,103, "Structurally Controlled Deposition of Silicon Onto Nanowires," filed May 12, 2015, Weijie Wang, et al.
JP patent application No. 2012-556203, Office Action dated Jul. 14, 2015.
IL patent application No. 216100, Office Action dated May 4, 2015.
U.S. Appl. No. 13/914,491, Notice of Allowance dated Jun. 19, 2015.
IL patent application No. 216100, Office Action dated Jun. 22, 2016.
CN patent application No. 201080026302.6, Office Action dated Nov. 10, 2015.
CN Office Action issued in Application No. 201280038037.2 dated Feb. 6, 2017.
JP Office Action issued in Application No. 2014-519238 dated Feb. 7, 2017.

TEMPLATE ELECTRODE STRUCTURES WITH ENHANCED ADHESION CHARACTERISTICS

CROSS-REFERENCE TO RELATED APPLICATIONS

This application claims the benefit of priority under 35 USC § 119(e) to U.S. Provisional Application No. 61/503,819, entitled "TEMPLATE ELECTRODE STRUCTURES WITH ENHANCED ADHESION CHARACTERISTICS," filed on Jul. 1, 2011, which is incorporated herein by this reference in its entirety for all purposes. This Application is also a continuation-in-part of U.S. application Ser. No. 13/039,031 (issued as U.S. Pat. No. 8,257,866), entitled "TEMPLATE ELECTRODE STRUCTURES FOR DEPOSITING ACTIVE MATERIALS," filed Mar. 2, 2011, which claims the benefit of priority to U.S. Provisional Application No. 61/310,183, entitled "ELECTROCHEMICALLY ACTIVE STRUCTURES CONTAINING SILICIDES," filed Mar. 3, 2010, and which is a continuation-in-part of U.S. application Ser. No. 12/437,529 (now abandoned), entitled "ELECTRODE INCLUDING NANOSTRUCTURES FOR RECHARGEABLE CELLS," filed May 7, 2009.

STATEMENT OF GOVERNMENT SUPPORT

The invention described and claimed herein was made with United States Government support under NIST ATP Award No. 70NANB10H006, awarded by the National Institute of Standards and Technology. The United States Government has certain rights in this invention.

SUMMARY OF INVENTION

In one embodiment of the invention, an electrode for use in a lithium ion cell is provided. The electrode has a nanostructured template, an electrochemically active material layer coating the template, and a first intermediate layer between the nanostructured template and the electrochemically active material layer. In one arrangement, the nanostructured template includes silicide nanowires. The electrochemically active material may be any of silicon, tin, germanium, carbon, metal hydrides, silicides, phosphides, and nitrides.

At least a portion of the electrochemically active material layer further includes a moderating additive that reduces swelling of the electrochemically active material layer upon lithiation. The moderating additive has a lithium capacity that is less than the lithium capacity of the electrochemically active material. For example, for silicon electrochemically active material, the first intermediate layer may be one or more of titanium, copper, iron, nickel, and chromium. In one arrangement, the moderating additive has a concentration that varies throughout the electrochemically active material layer.

The first intermediate layer may have a thickness between about 2 nanometers and 2 micrometers. The first intermediate layer may facilitate adhesion between the nanostructured template and the electrochemically active material layer, electronic conductivity within the electrode, and/or stress relaxation between the nanostructured template and the electrochemically active material layer. The first intermediate layer may facilitate by forming a compound and/or an alloy with materials in the adjacent electrochemically active material layer and/or in the adjacent nanostructured template. The first intermediate layer may facilitate electronic conductivity by reducing electronic resistance between the nanostructured template and the electrochemically active material layer. In some arrangements, the electronic resistance is reduced because the sum of the contact resistances between the intermediate layer (and any compounds or alloys it may form) and the adjacent nanostructure template and electrochemically active material layer layers is less than the contact resistance between the nanostructure template and electrochemically active material layer when there is no intermediate layer. The first intermediate layer may facilitate stress relaxation between the nanostructured template and the electrochemically active material layer because the first intermediate layer has elastic properties that allow it to absorb at least some of the stress from expansion and contraction of the electrochemically active material layer without transmitting all the stress to the nanostructured template.

In one embodiment of the invention, the electrode of also has a substrate that is coated with a second intermediate layer, and at least the nanostructured template is in contact with the second intermediate layer. The second intermediate layer may also facilitate adhesion between the nanostructured template and the substrate, electronic conductivity within the electrode, and/or stress relaxation between the nanostructured template and the substrate. In one arrangement, the second intermediate layer is the same as the first intermediate layer.

In another embodiment of the invention, another electrode for use in a lithium ion cell is provided. The electrode has a conductive substrate with a metal surface, a nanostructured template on the metal surface, an electrochemically active material layer coating the nanostructured template, a first intermediate layer between the nanostructured template and the electrochemically active material layer, and a second intermediate layer between the first surface of the conductive substrate and the nanostructured template. The metal may include any of copper, nickel, titanium, and stainless steel. The conductive substrate may include a base substrate and a thin metal foil that is attached to the base substrate, such that the thin metal foil provides the metal surface mentioned above. The thin metal foil may have a composition that is different from the base substrate. The first intermediate layer and the second intermediate layer may facilitate one or more of adhesion, electronic conductivity, and stress relaxation as described above. The electrochemically active material layer may include one or more of silicon, tin, germanium, carbon, metal hydrides, silicides, phosphides, and nitrides.

In one arrangement, at least a portion of the electrochemically active material layer further includes a moderating additive that reduces swelling of the electrochemically active material layer during lithiation. The moderating additive may have a lithium capacity that is less than the lithium capacity of the electrochemically active material. The moderating additive may be any of oxygen, titanium, tin, germanium, nickel, copper, carbon, nitrogen, aluminum, and tungsten and may have a concentration that varies throughout the electrochemically active material layer. In one arrangement, the concentration of the moderating additive in the electrochemically active material is highest in regions of the electrochemically active material layer that are adjacent to the conductive substrate. In another arrangement, there is substantially no moderating additive in portions of the electrochemical active material layer that are adjacent to its outer surface.

These and other aspects of the invention are described further below with reference to the figures.

DETAILED DESCRIPTION OF EXAMPLE EMBODIMENTS

Figure 1:
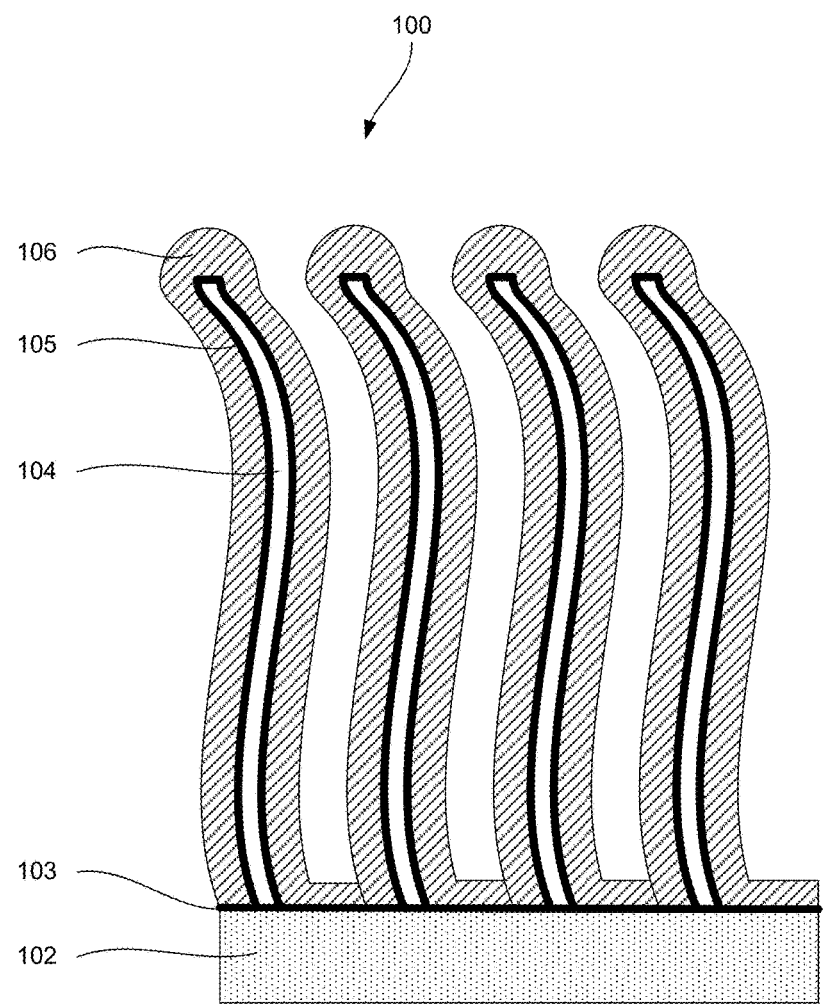
FIG. 1 is a schematic depicting an example of an electrode structure containing a nanostructure template and an electrochemically active layer in accordance with certain embodiments.

Structures formed from certain electrochemically active materials, such as silicon, tend to change their shape and size during their lithiation cycles. These materials swell while receiving lithium during lithiation and contact while releasing lithium during delithiation. For example, silicon expands as much as 400% when lithiated to its theoretical limit corresponding to the $Li_{4.4}Si$ phase. At the same time, conductive substrates typically used for supporting these active materials retain their shape and size. Some typical substrates examples include thin metal foils. This difference in behavior coupled with generally direct contact between the two electrode components makes it difficult to maintain mechanical and electrical connections between the substrate and active material layer during lithiation cycling. The interface between the two components experiences high stress levels caused by the static nature of the substrate and dynamic nature of the active material layer. Moreover, this stress tends to concentrate at the interface, pulling the two materials apart. As a result, active material layers tend to crack and delaminate from their substrates resulting in capacity losses and even presenting some safety issues, such as internal electrical shorts caused by delaminated particles.

A nanostructured template formed on a conductive substrate helps to mitigate some of these problems. The nanostructured template provides a much larger surface area for supporting the active material than the corresponding area of the flat substrate. As such, an active material layer deposited onto such a large surface area template may be much thinner than a layer formed on a smaller flat substrate while still having the same capacity. A very thin active material layer is believed to undergo less mechanical stress or, more specifically, less mechanical stress concentration at its interface with a template or some other supporting structures during lithiation cycles.

A template is a static component and does not change its size or shape during lithium cycling. At the same time, an active material layer formed from materials exhibiting swelling and contraction during lithiation is a dynamic component. Even though stress levels are smaller for thinner active materials layers, some stress still concentrates at the interface between the template and active materials layer. Furthermore, forming a template on a substrate creates an additional interface between the template and substrate, which needs to be stable as well. The template approach described above relies on attachment between the template and substrate to maintain overall battery function. Forces exerted by the active material during lithiation may move the template structures relative to the substrate (i.e., "pull" these structures out of the substrate), especially if a substantial amount of the active material is deposited near the template-substrate interface.

It has been found that these interface delamination problems may be successfully mitigated by modifying interface boundaries with certain techniques and/or using certain materials that help to reduce stress concentration at the interfaces and/or to provide stronger bonds at the interfaces. While the stress may still exist in the newly proposed systems as well as static and dynamic electrode components, these components are now separated by elastic materials, in certain embodiments. In the same or other embodiments, stress at some interfaces is reduced by incorporating moderating additives into at least a portion of the active materials and effectively creating semi-dynamic components at the interface. Furthermore, newly proposed electrode components may form interfacial alloys that provide stronger bonds.

The new materials and techniques disclosed herein improve adhesion and attachment of electrochemically active layers (e.g., silicon shells) to templates (e.g., nickel silicide nanostructures). Preserving interface adhesion during lithiation cycles improves overall battery performance by preventing material islanding, delamination, and detachment at stressed and or weak interfaces. Cracking at interfaces due to excessive stress build-up can create loose electrode material fragments. Such lose fragments are passivated as a Solid Electrolyte Interphase (SEI) layer is formed on their surfaces. Generally loose fragments are not attached to other electrode components, and the possibility of attachment is further prevented by the SEI layer. The loose fragments become electrically disconnected from other electrode components and no longer take part in the functioning of the cell, adding dead weight and volume and lowering the energy density of the cell. The new materials and techniques disclosed herein offer real improvements that can successfully mitigate this problem.

In one embodiment of the invention, a template is modified by coating with silicide forming materials, such as copper, nickel, and titanium, to increase the amount of the alloyed active material at its interface with the template and substrate as further described below, for example in a section entitled "Adhesion layer at the template-active material interface." Another example includes modification of a template using adhesion promoters and oxygen getters, such as titanium and chromium. These materials may be plated, evaporated, and/or sputtered. In yet another example, the template is modified using super-elastic alloys, such as nickel titanium alloy with nitinol. These alloys may be coated onto the template prior to forming an electrochemically active layer. It is believed that these alloys may reduce stress at the interface between the active material layer and template or at least redistribute the stress. Furthermore, increasing roughness of the substrate surface used to form a template can improve adhesion and reduce in-plane lithiation stress at the interface. Some of these examples may be combined with others to further improve the stability of one or both interfaces. The proposed electrode systems have been tested by depositing various materials over the template after its growth and/or by depositing various materials under the template seed layer. In both cases, these materials can remain as separate components that are distinct from other components (active materials, template, and substrate) or can be integrated into one or more other components to create an interface that may not be well-defined, i.e., a "mixed interface" or "gradual interface". Furthermore, some of these materials are believed to improve flexibility and adhesion of the template layer. These and other embodiments will now be described in more detail.

To provide a better understanding of various embodiments, a brief description of the electrode structure containing a nanostructure template and an electrochemically active layer is provided below with reference to FIG. 1. Electrode structure 100 includes a conductive substrate 102, which may be a metallic foil, a mesh, or any other suitable substrate material and/or structure further described below. Conductive substrate 102 may be used as a mechanical support to other electrode components and as a current collector. As such, it is often referred to as a current collector substrate. It should be noted that in certain embodiments, an electrode may be fabricated without a conductive substrate, and mechanical support and current collection functions are provided by other components.

Electrode structure 100 also includes a nanostructured template 104 positioned adjacent and attached to conductive substrate 102. Nanostructured template 104 provides a large surface area for depositing an active material. Nanostructured template 104 facilitates conduction of electrical current to and from the electrochemically active material and provides support to this material. Electrode structure 100 also includes an electrochemically active material layer 106, which is a layer containing at least an active material, such as silicon. Electrochemically active material layer 106 may also include other materials, such as moderating additives that can reduce the amount of swelling the electrochemically active material layer undergoes upon lithiation. Various examples of conductive substrate 102, nanostructured template 104, and electrochemically active material layer 106 are further described below.

Electrode structure 100 has at least two interfaces between the three main components described above. There is one interface, which may be referred to as a template-substrate interface 103, between conductive substrate 102 and nanostructured template 104. Another interface, which may be referred to as an active material-template interface 105, is positioned between nanostructured template 104 and active material layer 106. Some active material 106 may be deposited adjacent to conductive substrate 102 forming yet another interface, i.e., an active material-substrate interface. For purposes of this document, the active material-substrate interface is considered a part of the template-substrate interface 103 unless otherwise stated. These interfaces may be specifically configured to prevent or at least minimize component separation from one other (e.g., delamination of the active material from the template) various examples of these configurations will now be explained in more detail.

Adhesion Layer at the Template-Active Material Interface

In certain embodiments, a specifically configured adhesion layer is provided at the active material-template interface 105 to improve adhesion of the electrochemically active material 106 to nanostructure template 104. It may be achieved by forming a metallurgical alloy between the template and adhesion layer and/or between the active material and adhesion layer. Other forms of material combinations, such as chemical compounds, may be used as well. In specific embodiments, silicon is used as an active material, and an adhesion layer includes one or more materials capable of forming silicide. Furthermore, a template may include a metal silicide. An adhesion layer provided over this template may include the metal used in forming the metal silicide. Alloys and other material combination types help improve the strength of active material-template interface 105 and, in certain embodiments, reduce stress concentration at this interface. An adhesion layer may have a thickness of between about 2 nanometer and 2 micrometers. Such layers can also reduce interactions (e.g., chemical reactions, alloying) between the substrate, template, and active materials.

Generally, the adhesion layer may include one or more of the following materials: titanium, copper, iron, nickel, tungsten, molybdenum, tantalum, and chromium. With the exception of copper, these metals generally do not form silicides easily (i.e., as easily as nickel). Still some nano-scaled silicide formation is possible on the surface of such metal layers. The nano-scaled silicide formation can be useful for further processing, e.g., controlling template dimensions and distribution as well as other parameters. Some specific examples include nickel titanium alloys.

In certain embodiments, a nanostructured template that includes nickel silicide is coated with an intermediate thin layer of titanium before the active material is coated onto the template. This intermediate layer may be annealed or otherwise processed to form nickel titanium alloys at the interface of the template and the active material layer. One particular alloy, in which nickel and titanium are present in substantially equal atomic concentrations, is nitinol. Nitinol has super-elastic characteristics and exhibits superior elasticity some 1-30 times that of ordinary metal. These super-elastic characteristics may help to relax stress at the active material-template interface 105 of FIG. 1 by absorbing at least some of the stress from expansion and contraction of the active material layer without transmitting the stress to the template. Alloying treatments may be performed prior to depositing an electrochemically active material layer, during this deposition, or even after the deposition.

Adhesion Layer at the Template-Substrate Interface

In certain embodiments, an adhesion layer is provided at the template-substrate interface 103 to facilitate adhesion of nanostructure template 104 to the substrate 102. It may be formed from the same materials listed above and have the same general structure. For example, an interface between the template and substrate may include a nickel "rich" silicide phase while an interface between the template and active material layer may include a nickel "poor" silicide phase, which contains less nickel and more silicon than the nickel "rich" silicide phase.

There can be problems associated with using very thin metal foils (e.g., less than 20 microns) as substrates, especially when the metal in the foil participates in formation of silicides nanowires. As the silicide nanowires are formed, the metal from the foil is consumed, causing substantial thinning of an already thin substrate foil. This can lead eventually to extreme brittleness in the foil and even mechanical failure. In addition, as the metal is consumed, holes can be created, which can cause a reduction in conductivity. In certain embodiments, a base substrate made of a conductive material that is not useful in forming the silicides nanowires, such as a copper substrate, is coated with a thin nickel layer prior to forming the silicide template. This nickel layer is then used as a source material to form a nickel silicide template, to protect the underlying copper, and to provide stronger adhesion between the template and copper substrate. Even if much of the nickel layer is consumed in the silicides formation, the copper substrate stays intact. For example, an interfacial alloy may be formed between the copper substrate layer and the nickel adhesion layer. The nickel layer also forms a metallurgical bond with the nickel silicide template as further explained below The two types of adhesion layers described above (i.e., at the active material-template interface 105 and at the template-substrate interface 103) can be used in the same electrode structure. Specifically, one adhesion layer may be positioned between the substrate and template while another may be positioned between the template and active material. Various techniques may be used for depositing such adhesion layers. Some examples include electroplating, evaporation, and sputtering. In one embodiment of the invention, the adhesion layer has a thickness between about 2 nanometers and 2 micrometers.

Active Material Additives Near the Substrate Interfaces

In certain embodiments, swelling of the active material is selectively reduced within the active material layer by introducing certain moderating additives into selected regions of the layer. A moderating additive is specifically configured to limit swelling of the active material layer when introduced into the layer. Only selected regions of the active material layer receive the moderating additives. These regions are typically positioned adjacent to other static electrode components, such as the template and the substrate. The static components do not change their shape or size and, therefore, large dimensional changes of the active materials layer adjacent to the static components is not desirable. As such, the selected regions of the active material layer that contain the moderating additive are reduced in their ability to swell, while the rest of the layer can swell upon lithiation as usual. The term "moderating additive" is used to identify the material that tend to reduce or moderate lithiation capacity of active materials (and their ability to expand) at the potentials used in battery cycling.

To avoid a major decrease in the overall electrode capacity, the selected regions are relatively small in comparison to the overall volume of the active material layer. The amount of the material in these regions may be also small. Furthermore, the moderating additives within the active layer may be distributed in a gradient, which can help to relieve stress concentrations at the interfaces.

In certain embodiments, a moderating additive is unevenly distributed in the active material layer. Specifically, the moderating additive may have a higher concentration in parts of the layer adjacent to the substrate than in parts adjacent to the distal surface of the template structure, e.g., near the free ends of silicide nanowires. This approach helps to reduce stress at the template-substrate interface, helping to preserve the mechanical and electrical connections between them. Examples of moderating additives that may be used with a silicon-based active material include oxygen (e.g., silicon mono-oxide), titanium, tin, germanium, nickel, copper, other silicide forming metals, carbon, nitrogen, aluminum, tungsten, and other lithium accepting materials that have capacities lower than silicon. In one arrangement, swelling may be reduced by replacing some amount of active material with other materials that have lower lithiation capacities (and swelling upon lithiation) and/or by holding some regions of the active material rigid relative so that swelling cannot occur. A concentration of the moderating additive may be at least about 1 atomic % or, more specifically, at least about 10% (e.g., in the case of oxygen). In certain embodiments, oxygen concentration may be as high as 90% and even higher right at the interface with a decreasing gradient away from the interface. For example, oxygen may be present within a thickness of less than about 500 nm and even less than about 100 nm from the interface. Concentrations and overall amounts of other materials that can lithiate may be much higher without much impact on the overall lithiation capacity. At the same time, there may be substantially no active material at the opposite side of the template structure.

In another embodiment, the moderating additive may have a higher concentration near an interface between the active material layer and the nanostructure template than in other portions of the active material layer. This helps to keep stress away from the active material-template interface and to maintain the attachment of the active material layer to the template.

Variable concentrations of moderating additives in the active material layer may be achieved by varying the supply of various precursors during deposition of the active material layer as further explained below. For example, oxygen can be introduced into the deposition chamber during initial formation of the active material layer over the template. The oxygen concentration in the electrode structure is then higher near the substrate-rooted ends than near the free distal ends of the template. Silicon oxide tends to swell much less than silicon, so the oxygen distribution helps to reduce the stress at the template-substrate interface. At the same time, relatively low concentrations of oxygen in other parts of the active material seem not to significantly reduce the overall capacity.

Roughening Substrate or Template Structures

Figure 2A:
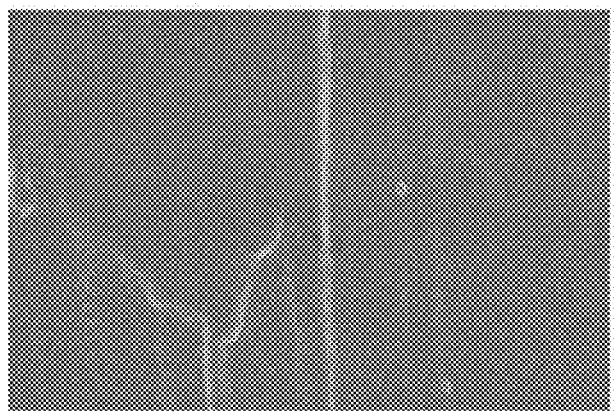
FIGS. 2A-2C are images illustrating surface roughness of a nickel surface prior to and after various treatments in accordance with certain embodiments.
Figure 2B:
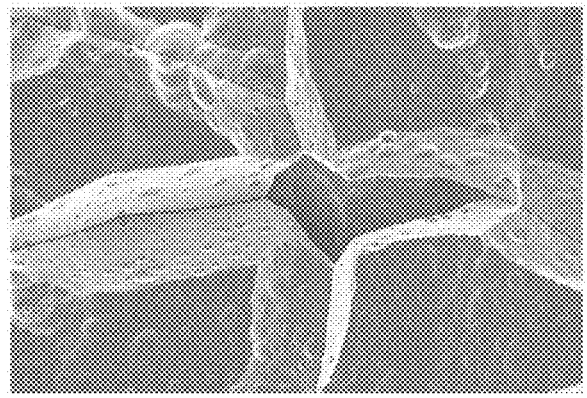
Figure 2C:
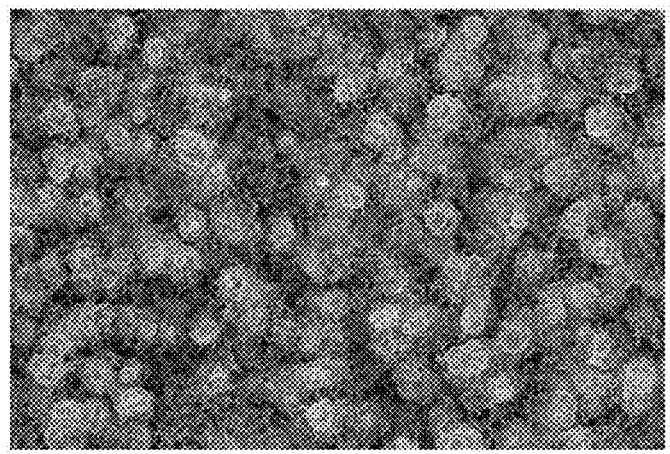

It has been also found that strength of an interface may be substantially improved by using a rough surface instead of a smooth surface to form the interface. A rough surface has a higher surface area and provides more sites for attachment of additional structures than does a smooth surface. A rough surface also helps to redistribute stresses created during lithiation cycles. Without being restricted to any particular theory, it is believed that a rough surface may also provide small cavities for expansion of the active material during lithiation cycles. A surface roughness may be at least about 0.5 micrometers or, more specifically, at least about 2 micrometers, such as between about 2 micrometers and 4 micrometers. Roughening techniques may include chemical etching, electrochemical dissolution, pulse plating, sputtering, sand-blasting, oxidation, and reduction. For example, a nickel surface may be roughened by treatment with nickel etchant TFB, which is a solution of nitric acid and potassium perfluoroalkyl sulfonate in water. FIG. 2A illustrates an initial surface of a nickel foil before any treatments have been performed. FIG. 2B illustrates the same type of foil after some partial chemical dissolution of nickel—i.e., an electrolytic etching performed in sulfuric acid at a current density of 20-100 mA/cm$^2$. FIG. 2C illustrates the same type of foil, this time roughened by converting some nickel into silicide, i.e., performing some initial silicide deposition. Surfaces of the last two examples have approximately a micron scale roughness, while the starting foil shown in FIG. 2A is much smoother.

In certain embodiments, a processing method involves depositing a nickel layer comprising nickel over the nanostructured template, treating the nickel layer to form a roughened surface, and forming a layer of an electrochemically active material on the roughened surface, the electrochemically active material configured to take in and release lithium ions during cycling of the lithium ion cell. The nanostructured template may facilitate conduction of electrical current to and from the electrochemically active material through the roughened nickel.

Examples of Silicide Templates

To provide a better understanding of the techniques and materials described above, various examples of silicide templates and respective active material coatings are provided below.

Various embodiments are described herein with reference to nanowires. It should be understood, however, that unless otherwise stated, the references herein to nanowires are intended to include other types of nanostructures including nanotubes, nanoparticles, nanospheres, nanorods, nanowhiskers, and the like. Generally, the term "nanostructures" refers to structures having at least one dimension that is less than about 1 micrometer. This dimension could be, for example, a diameter of the nanostructure (e.g., a silicide template nanowire), a thickness of the shell formed over a template (e.g., a thickness of the amorphous silicon layer), or some other nanostructure dimension. It should be understood that any of the overall dimensions (length and diameter) of the final coated structure do not have to be at a nanoscale. For example, a final structure may include a nano-layer that is about 500 nanometers in thickness and coated over a template that is about 100 nanometers in diameter and 20 micrometers in length. While this overall structure is about 1.1 micrometers in diameter and 20 micrometers in length, it could be generally referred to as a "nanostructure" because of the dimensions of the template and active material layer. In specific embodiments, the term "coated nanowire" refers to structures with nano-scaled shells positioned over elongated template structures.

Nanowires (as a specific case of nanostructures) have an aspect ratio of greater than one, typically at least about two and more frequently at least about four. In specific embodiments, nanowires have an aspect ratio of at least about 10 and even at least about 100. Nanowires may make use of their one larger dimension to connect to other electrode components (e.g., a conductive substrate, other active material structures, or conductive additives). For example, nanowires may be substrate rooted such that one end (or some other part) of the majority of the nanowires is in contact with the substrate. Because the two other dimensions are small and there is an adjacent void volume available for expansion, the internal stress built up in the nanowires during lithiation (e.g., through expansion of the nano-shells positioned over the silicide templates) is also small and does not break apart the nanowires (as happens with larger structures). In other words, certain dimensions of the nanowires (e.g., an overall diameter and/or a shell thickness) are kept below the corresponding fracture levels of the active material used. Nanowires also permit a relatively high capacity per unit area of the electrode surface due to their elongated structure, which corresponds to the height of the template structure. This results from their relatively high aspect ratio and terminal connection to the substrate.

Depositing nanostructures containing high capacity materials may be a slow process that requires expensive materials, such as the gold catalyst used in a Vapor-Liquid-Solid (VLS) deposition process. Battery electrodes produced using such processes may be cost prohibitive for certain consumer applications, such as portable electronics and electrical vehicles. Furthermore, VLS deposition typically yields crystalline structures, which are more rigid than amorphous structures and, therefore, more susceptible to cracking and pulverization. Finally, a substrate connection of the VLS-deposited structures may be weak due to the distinct interface of two different materials (e.g., metallic substrate and high capacity active material), one of which undergoes substantial swelling while the other one does not. Without being restricted to any particular theory, it is believed that these phenomena could undermine the cycling performance of the batteries built from such electrodes.

It has been found that some metal silicide nanostructures can be formed directly on certain substrates without using catalysts. The silicide structures may be formed on surfaces that contain the metal making up the metal silicide. Such source metal containing substrate surfaces may be provided in various forms, such as a foil of the source metal or a thin source metal layer on a base substrate current collector layer (e.g., a thin nickel layer formed on a surface of a stainless steel or copper foil). In some examples, the source metal containing surfaces are treated prior to the formation of silicide structures in order to promote the silicide formation process. For example, a nickel-containing surface may be oxidized prior to forming nickel silicide nanostructures. As further explained below, such oxidation creates nucleation points for nickel silicide formation. Overall, it has been found that oxidation allows a broader processing window during template formation.

An array of silicide nanostructures can serve as a high surface area template that is later coated with high capacity active materials to form a "composite" electrode. For purposes of this document, a "template" generally includes an array of nanostructures used for supporting active materials in the battery electrode. The template may provide both mechanical support and/or electrical communication to the active material with respect to, for example, a conductive substrate. In certain embodiments, the template is arranged as a layer adjacent to the substrate and may be characterized by its height or thickness. Such an arrangement may be referred to as a "template layer," which should be distinguished from other types of layers, such as an active material layer. This distinction is further pointed out in the description below. An adjacent substrate may be present in some but not all embodiments. In certain embodiments, a template coated with an active material may be directly connected to other conductive elements of a cell (other than a conductive substrate), such as electrical lead wires and battery terminals. In specific embodiments, a template may include a single layer of silicide nanowires extending generally away from the substrate, and in some embodiments in substantially the same direction. The height of this template will generally correspond to the average length of the nanowires. However, it should be understood that other silicide structural arrangements are also possible (e.g., multi-layered silicide templates).

A "template structure" generally refers to an individual structure that is a part of the template. Some template structures include silicide materials, while some structures in the same template may include other materials (e.g., conductive additives). Typically, template structures have at least one nano-scaled dimension (e.g., a diameter). Therefore, such template structures may be referred to as template nanostructures. In some embodiments, the template nanostructures may be shaped as nanowires with substrate rooted ends (or other portions) that form an integral structure with the substrate. In other words, they may not have a clearly defined morphological boundary or interface with the substrate surface to which the silicide nanowires are attached. As a result, substrate rooted nanowires may have superior mechanical adhesion to the substrate and low electrical contact resistance, for example, in comparison to the VLS-deposited structures Further, many silicides are good electrical conductors and can provide a highly conductive path between the active material on the silicide nanowires and, for example, a current collecting substrate. Electrodes including metal silicide templates are also described in U.S. patent application Ser. No. 13/039,031, filed Mar. 2, 2011, titled "TEMPLATE ELECTRODE STRUCTURES FOR DEPOSITING ACTIVE MATERIALS," which is incorporated by reference herein for the purposes of describing such electrodes and related methods of fabrication.

Metal silicides can also act as active materials themselves and be subjected to lithiation. However, silicides generally have far lower capacity than, for example, silicon or tin. Therefore, a silicide template may contribute comparatively less to the overall capacity of the electrode. This contribution may be particularly small when there is substantially more active material than there is silicide material. For example, silicide nanowires that are only about 10 nanometers in diameter may be used as a template for deposition of an active layer that is at least about 50 nanometers in thickness or, more specifically, between about 300 nanometers and 500 nanometers in thickness. In this example, a ratio of the active material volume to the silicide volume is at least about 400. Therefore, such composite electrodes may be used with substantially no lithiation of the silicide template. Minimal or substantially no lithiation of the silicide structures means that there is little or no swelling of the silicide structures, which help to preserve their integrity as a template and the integrity of their connections to the substrate. These characteristics lead to strong and robust mechanical and electrical connections within the electrode and, as a result, stable cycling performance over a large number of cycles. Various other features, such as cone-shaped silicide structures with thicker bases and cone-shaped (or mushroom-shaped) active material layers with thicker free-ends, may be used to help maintain these connections. These features are typically focused on reducing swelling near the substrate interface.

A silicide template containing nanowires has a large surface area available for supporting active materials. In certain embodiments, nanowires employed as the template are between about 5 nanometers and 100 nanometers in diameter and between about 1 micrometer and 100 micrometers in length, for example between 10 micrometers and 100 micrometers in length. The nanowires may be densely spaced. Template structures that are closely spaced may share a common coating shell effectively forming a multi-core single shell arrangement. In such cases, the template growth density does not necessarily correspond to the density of the coated nanostructures. In certain embodiments, spacing between template structures may be even less than the coating thickness, thereby causing significant interconnections of the active material layer. These interconnections are particularly prominent near the bases, creating agglomerated or continuous film like structures, which impede good cycle performance. Generally, it is desirable to avoid nanowire agglomerates, which are sometimes referred to as "bunches" or "bush-like" aggregates, further described with reference to FIG. 3B.

Often the template has a surface area that is orders of magnitude greater than that of a typical substrate. The template can be coated with a thin layer of active material and, thereby, provide an electrode that has a substantial reversible energy density. It should be noted that an active material layer may or may not be a continuous layer extending over the entire template or over the entire substrate. In some embodiments, an active material layer is a collection of active material regions positioned over the silicide template structures and perhaps over the substrate. Some of these active material shells may not be in direct contact with the substrate, for example, when there are intermediate layers on the substrate surface. Various examples of the active material layer are described below. The thickness of the active material layer is generally chosen based on the characteristics of the active material used and is generally kept below the fracture limit for the particular active material.

The thickness of the active material layer coating on a template should be distinguished from the thickness of the battery electrode. The thickness of the active material layer is generally nano-scaled, while the thickness of the battery electrode generally corresponds to at least the height of the template and could be tens of micrometers. It should be noted that template structures (e.g., silicide nanowires) are typically not perfectly vertical. Therefore, the template height may be somewhat less than the lengths of these structures. Generally, the conductive substrate also contributes to the thickness of the electrode. In one example, a 100 nanometer thick silicon layer deposited onto 10 micrometer long nanowires that are 10 nanometers in diameter and spaced apart by 500 nanometers can provide an energy density comparable to that of a conventional graphite negative electrode that is substantially thicker. As such, electrochemical cells with improved gravimetric and volumetric capacity characteristics can be constructed using these active material structures and electrodes.

Once the template is formed, active materials can be deposited as a layer over this template in a relatively fast manner and without a need for expensive catalysts. Further, certain deposited active materials may take some more desirable morphological forms. For example, a catalyst-free silicon deposition over nickel silicide nanowires yields amorphous silicon, while growing silicon nanowires from gold catalyst islands using VLS yields crystalline silicon. Without being restricted to any particular theory, it is believed that amorphous silicon structures have fewer and weaker atomic bonds, which allows such structures to retain their integrity better than the more rigid crystalline structures when exposed to the stress encountered during repeated lithiation/delithiation cycles. Also, deposition techniques used to form an active material layer may be specifically tuned to control distribution of the active material along the template height (e.g., depositing more active material near free-ends of the active material structures than near the bases) and to control other characteristics of the deposited materials, such as composition, porosity, and others.

Furthermore, various techniques have been proposed to protect the electrical connection between nanowires and conductive substrate. In one class of techniques, the coated nanowires, i.e., structures with nano-scaled shells positioned over elongated template structures, have a "top heavy" shape in which the region where the coated nanowire approaches and contacts the substrate, is thinner than the distal region of the coated nanowire. Generally, the distal region has substantially more active material than the attachment region. In another class of techniques, the spacing of the template nanowires is controlled such that the individual wires are relatively evenly spaced in their attachment to the substrate. In specific embodiments, a mechanism is employed to prevent the template nanowires from bunching near to one another at their attachment regions. In yet another class, certain "passivation" techniques and/or materials are employed to minimize mechanical distortions and stresses at the substrate interface that are generally caused by swelling and contraction of the active materials.

Figure 4:
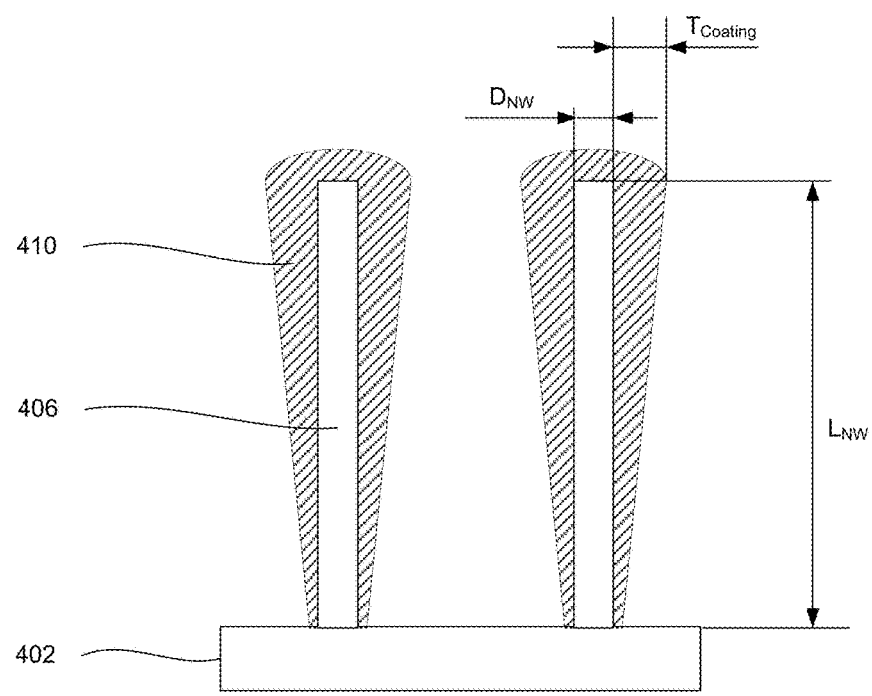
FIG. 4 is a schematic representation of an example of an active material layer deposited over template structures arranged on a substrate according to certain embodiments.

Some examples of top heavy shapes include shapes that have gradually and continuously increasing cross-sectional dimensions (e.g., diameter) from the substrate rooted ends to the free ends (similar to the ones shown in FIG. 4). In other embodiments, the cross-sectional dimensions may increase gradually but not continuously. Other examples include shapes that increase their cross-sectional dimensions abruptly but continuously. Furthermore, other examples include shapes that increase their cross-sectional dimensions abruptly and not continuously. The overall coated nanowire shape is determined by the combination of the thickness of the active material layer and the profile of the template structures. For example, a template structure may have a wider base than free end, while a distribution (thickness) of the active material coating may be such that the overall electrode structure has free ends wider than the base ends.

Figure 5:
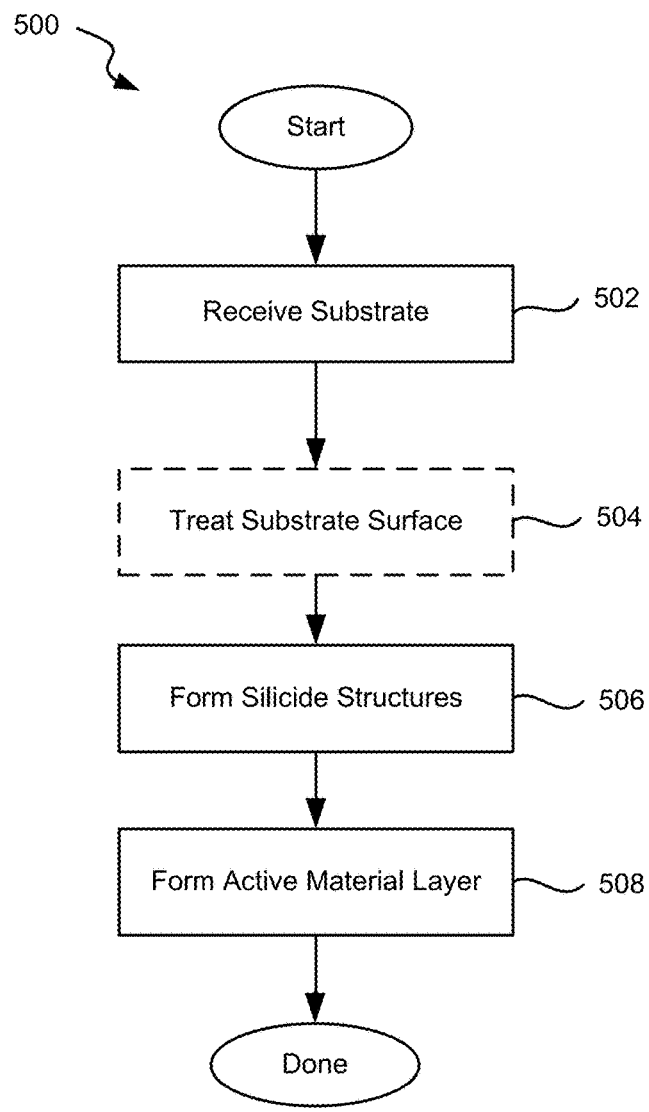
FIG. 5 illustrates a process of fabricating an electrochemically active electrode containing a metal silicide template and an active material according to certain embodiments.

FIG. 5 illustrates a process 500 of fabricating an electrochemically active electrode containing a metal silicide template and a high capacity active material, in accordance with certain embodiments. The process starts with receiving a substrate (operation 502). A substrate material may be provided as a roll, sheet, or any other form that is fed into a process apparatus used in one or more of subsequent operations. Typically, the substrate is made from a material that can serve as an electrode current collector, although this need not be the case (as explained below). Examples of suitable apparatus include Chemical Vapor Deposition (CVD) apparatus (e.g., Thermal CVD or a Plasma Enhanced CVD apparatus), Physical Vapor Deposition (PVD) apparatus, and other apparatus suitable for performing the operations described below. In certain embodiments, one or more operations of the described process are performed in a vertical deposition apparatus such as that described in U.S. patent application Ser. No. 12/637,727 entitled "Apparatus for Deposition on Two Sides of the Web" filed on Dec. 14, 2009 to Mosso et al., which is incorporated by reference herein in its entirety for purposes of describing a vertical deposition apparatus.

The substrate is typically a part of the electrode (e.g., a current collector substrate). However, it may also be used as a temporary carrier that supports the template and active material during fabrication, and/or as a source of material during electrode fabrication (e.g., a source of metal in a metal silicide formation process), and then later removed, while the template is electrically connected to the current collector components of the battery. If a substrate becomes a part of the electrode, it may generally include a material suitable for use in this electrode (from mechanical, electrical, and electrochemical perspectives). Examples include continuous foil sheets, perforated sheets, expanded metals, and foams.

In certain embodiments, the substrate includes a metal containing source material that can be consumed to form metal silicide nanostructures. Examples of suitable metal containing materials are provided below. A metal containing source material may be a layer supported on a base substrate layer which serves as a mechanical support for the template and the active materials. Alternatively or in addition, the base substrate layer may serve as an electrical current conductor between the silicide nanostructures (and, to in some cases, the active materials) and the battery electrical terminals.

Various intermediate layers may be provided between the base substrate and the metal containing source material layer. For example, a layer containing copper and/or nickel may be deposited between the base substrate and the metal containing source material layers to improve metallurgical and electronic connections of the later-formed template to the base substrate. In a specific embodiment, a base substrate containing a conductive material (e.g., stainless steel) is coated with a thin intermediate layer of copper followed by a thicker layer of nickel (e.g., between about 10 nanometers and 3 micrometers). The nickel layer is then used to form a nickel silicide template, while the intermediate copper layer acts as an adhesion and conductive intermediary between the nickel layer and the base substrate.

In certain embodiments, the same material serves as both the current collecting base substrate and the metal containing source material layer for the silicide template. Examples of materials that may be used as both a base substrate and a metal source for the silicide include nickel, copper, and titanium, which may be provided as foils, perforated sheets, expanded metals, foams, and the like. In other embodiments, the base substrate contains two or more materials that form distinct sub-layers or other structures (e.g., a copper base foil coated with a thin nickel layer). In some cases, the metal source material may be distributed throughout the base substrate as discrete droplets, particles, or arranged in regular patterns. Typically, though not necessarily, the metal containing material used to form the silicide is positioned on the base material surface so that it is directly exposed to the processing environment (e.g., a silicon containing precursor gas) during processing. Generally, distribution of the two materials within the same structure may be uniform (an alloy or compound in the extreme case) or non-uniform (e.g., a gradual distribution with more metal source material concentrating near the surface).

Examples of base materials include copper, copper coated with metal oxides, stainless steel, titanium, aluminum, nickel, chromium, tungsten, metal nitrides, metal carbides, carbon, carbon fiber, graphite, graphene, carbon mesh, conductive polymers, or combinations of the above (including multi-layered structures). The base material may be formed as a foil, film, mesh, foam, laminate, wires, tubes, particles, multi-layered structure, or any other suitable configuration. In certain embodiments, a base material is a metallic foil with a thickness of between about 1 micrometer and 50 micrometers or, more specifically, between about 5 micrometers and 30 micrometers.

Examples of metal containing source materials include nickel, cobalt, copper, silver, chromium, titanium, iron, zinc, aluminum, tin and their combinations, and alloys such as include nickel/phosphorus, nickel/tungsten, nickel/chromium, nickel/cobalt, nickel/iron, nickel/titanium, and nickel/molybdenum. As mentioned, in certain embodiments, a metal containing source material forms a layer on the top of the base substrate. Such a source layer may be at least about 10 nm thick or, more specifically, at least about 100 nm. In certain embodiments, a source layer may be up to about 3 micrometers thick. In other embodiments, a metal containing source material forms particles or some other discrete structures on the surface of the base substrate. These discrete structures may be provided in a thickness of at least about 10 nanometers thick or, more specifically, between about 10 nanometers and 50 micrometers. In general, a substrate should have a sufficient amount of the metal containing material near or on the substrate surface to form silicide nanostructures. For example, a 20-nanometer thick nickel containing source material layer deposited over a copper base substrate may be sufficient to produce a dense mat of nickel silicide nanowires that are 20 micrometers long.

In certain embodiments, a thin layer of a masking material is formed using a PVD or some other deposition technique. A thickness of this layer may be between about 0.1 nanometers and 1.5 nanometers. It has been found that certain materials at such thicknesses do not form a continuous layer but instead form a collection of small separated islands or clumps. Specifically, masking materials may be deposited as small islands and used for masking the base substrate so that no metal is deposited in the masked areas. Alternatively or in addition to, masking materials may be deposited on top of a metal containing source material layer to mask template growth In certain embodiments, a metal containing source material layer may be patterned during deposition. For example, a masking layer (e.g., a mesh) may be positioned over the base substrate, and the metal containing source material layer is formed over this combination. The covered portions of the base substrate will be substantially free of the metal source material and will not form silicide structures during later operations. A test was conducted using a metal mesh positioned over a substrate surface. Titanium was then deposited through the open spaces in the mesh, forming titanium islands. These islands in turn blocked silicide formation in these areas, which resulted in a patterned template growth. A special mesh with small pitch may be fabricated using, for example, nano-imprint lithography or some self assembled techniques to achieved desired distribution of the masking particles.

Figure 3A:
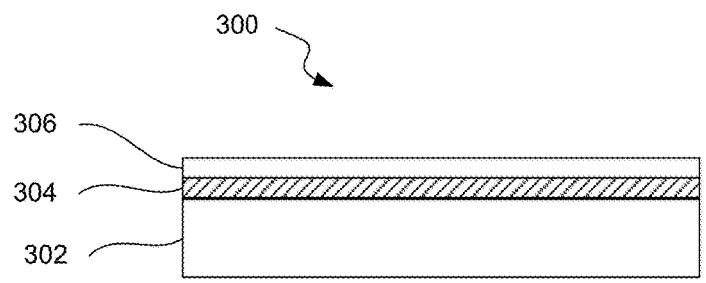
FIG. 3A is a schematic representation of an example of a three-layered substrate, in accordance with certain embodiments in accordance with certain embodiments.

A substrate may contain other materials that may be used to enhance the adhesion of subsequently formed silicide nanostructures, to protect the base substrate during processing and cell cycling, to promote nucleation of template structures, to prevent deposition of the active materials at (or near) the substrate interface, to act as an additional source of silicon during silicide formation, or to perform other functions. For example, a base substrate may include an intermediate layer to perform such function(s). FIG. 3A is a schematic representation of a three-layered substrate 300, in accordance with certain embodiments. There is a base substrate 302, a metal containing source material layer 306, and an intermediate layer 304. In certain embodiments (not shown), there may be additional intermediate layers. Additional examples and details of intermediate layers are provided in U.S. patent application Ser. No. 12/944,576 to DelHagen et al., entitled "INTERMEDIATE LAYERS FOR ELECTRODE FABRICATION" filed on Nov. 11, 2010, which is incorporated herein by reference in its entirety for purposes of describing intermediate layers. Still other materials and layer can be provided as a part of substrate. For example, a metal containing layer may have a metal oxide layer or a protective layer.

Figure 3B:
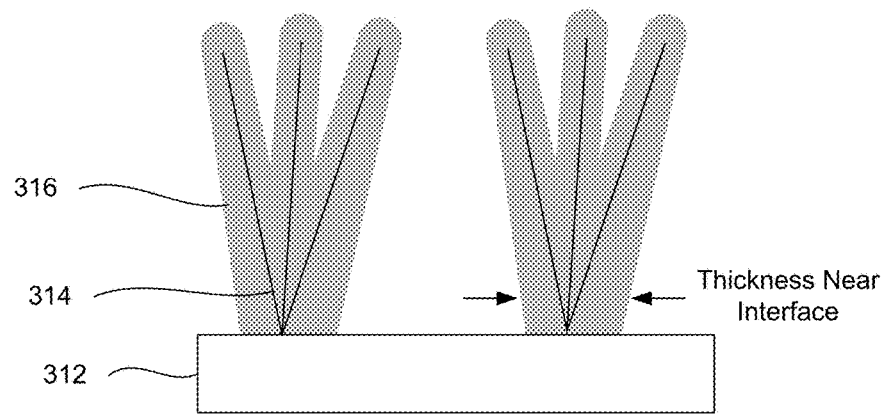
FIGS. 3B-3F are schematic representations of examples of various silicide structures according to certain embodiments.

Returning to FIG. 5, a substrate received in operation 502 may have a masking layer, which is positioned over the metal containing source material layer. The masking layer covers a portion of the metal containing source material layer, while exposing certain small spaced-apart areas. During formation of silicide structures in operation 506, the exposed areas are more available to react with silicon-containing precursors (e.g., silane), thereby resulting in the formation of discrete silicide structures such as the ones shown in FIG. 3C as opposed to the silicide structure clusters shown in FIG. 3B. Specifically, FIG. 3B is a schematic representation of clustered silicide structures 314 coated with the active material layer 316 that overlaps near the bases of the silicide structures (i.e., near the substrate 312) and forms bulky active material agglomerates. The overall dimension of the agglomerates (or the thickness of the active material near the substrate interface) may greatly exceed threshold limits for a particular active material, resulting in fractures and high stress near the interface during battery cycling. Not only may the active material delaminate from the silicide structures, but the entire silicide structure may separate from the substrate, thereby making them inoperative.

Figure 3C:
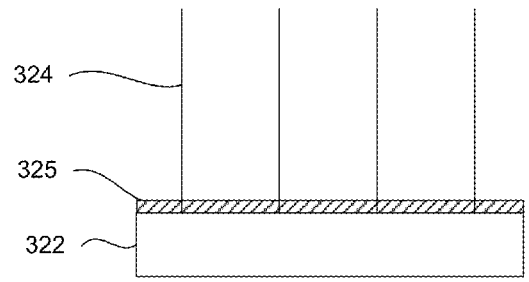

Depositing a masking layer may help to overcome such clustering. FIG. 3C is a schematic representation of separated silicide structures 324 formed through an masking layer 325 positioned over the base substrate 322, in accordance with certain embodiments. The masking layer 325 has openings that determine where the silicide structures 324 are formed, which allows for separate, distributed silicide structures 324 based on nucleation sites defined by the masking layer 325. The distribution of the template structures can be random or patterned, depending on the masking layer 325. Examples of masking layers include self-assembling zinc oxide particles and silicon oxide particles, and randomly oriented nanowires forming a mesh-structure over the metal containing source material layer. Some corresponding techniques to form islands from a masking layer or a metal containing source material layer include evaporation, angle deposition, self-assembly, lithography patterning, and others.

Figure 3D:
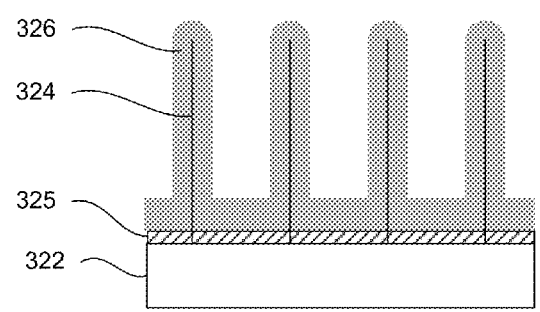

FIG. 3D is a schematic representation of separated silicide structures 324 (similar to the ones depicted in FIG. 3C and described above) coated with an active material layer 326. The active material layer 326 does not overlap near the bases of the silicide structures 324 to form agglomerates. As such, even at the substrate interface, the active material layer 326 is within the fracture threshold, which results in less mechanical stress and pulverization than, for example, the structures deposited in FIG. 3B.

Masking layers may remain as a part of the electrode or may be removed. The masking layer used to pattern the metal containing source material layer may be mechanically removed prior to formation of the silicide structures. The masking layer used to cover portions of the metal containing source material layer may be chemical removed after formation of the silicide structures (e.g., by selective etching of the masking layer without substantially disturbing the silicide structures). Specific examples include acid etching, heating, and evaporating. In other embodiments, the masking layer remains a part of the electrode and may be used, for example, to prevent deposition of the active material directly onto the substrate interface. Some of these examples are further described below with reference to FIGS. 3E and 3F.

It should be noted that substrate materials may interweave with each other (e.g., particles of the metal containing source material layer positioned among particles of the intermediate layer in a weave, felt, mesh, or comparable structure). Further, it should be noted that distinct materials may be provided together as a part of the substrate introduced to the process in operation 502, or one or more such materials may be deposited or otherwise integrated with the substrate in later processing operations.

Returning to FIG. 5, the process 500 may proceed with an optional treatment of the substrate surface (operation 504). The treatment may be used to modify the substrate surface in order to enhance silicide formation or for other purposes. Examples of such treatments include introducing materials used in metal silicide formation (e.g., sources of silicon, sources of the metal, catalysts, and the like), chemically modifying the substrate surface (e.g., forming oxides, nitrides, carbides, initial silicide structures, and treatments with various oxidizing and reducing agents), physically modifying the surface (e.g., increasing surface roughness by laser ablation, knurling, electro-polishing (such as electroplating and reverse-electroplating to increase the surface roughness), changing grain orientation, annealing, treating with oxygen based plasma to form an oxide, treating with argon based plasma to change roughness (e.g., sputter cone formation), sonication, and ion implantation. It should be noted that some of these techniques may be used to control amounts of various materials (e.g., a metal source material) present on the surface as well as the physical characteristics of these materials (e.g., surface roughness). For example, chemically modifying the substrate surface with reducing or oxidizing agents can be used to modify the roughness at a scale particularly useful for facilitating nucleation of the silicide structures. Sonication in acetone followed by methanol and isopropanol rinses may be used to clean metal foils prior to etching. Other techniques include oxygen plasma etching. Further, one may treat the surface with a dopant to increase the conductivity of the silicide structure if the dopant diffuses into the silicon reacting metal.

In certain embodiments, a substrate containing a nickel coating or other silicide source material on its surface is first oxidized. As mentioned above, a bulk of the substrate may be made from a silicide source material. A specific example includes nickel foil. When a nickel layer is used on a top of a base substrate, the thickness of the nickel coating may be between about 50 nanometers and 300 nanometers for the process conditions presented below. The temperature of the substrate during oxidation/treatment may be maintained at between about 150° C. and 500° C. for between about 0.1 and 10 minutes in the presence of oxygen or other suitable oxidant. In more specific embodiments, the oxidation is performed in the presence of air in a chamber maintained at about 50 Torr for about one minute, while the substrate is kept at about 300° C. The oxidation/treatment may proceed for between about 1 and 2 minutes. In certain embodiments, no specific oxidation/treatment operation 104 is made, and the process proceeds directly to operation 106 with formation of template structures. In order to achieve a more controlled formation of the silicide template, it can be useful to perform a specifically controlled oxidation operation. Specifically, it has been found that some oxidation helps formation of nickel silicide structures. Without being restricted to any particular theory, it is believed that during oxidation, a smooth nickel surface converts to a rougher nickel oxide surface. Rough oxide edges may serve as nucleation sites for later silicide formation. Further, the oxide may act as a mask to allow nucleation only at the pores of the oxide coating. This may help to achieve a more even distribution of silicide nanowires and to avoid clustering (as described above).

Another function of an oxidized surface may be to regulate the diffusion rate of the metal from the source material layer and to the reaction site. It has been found that excessive oxidation may be detrimental to silicide formation. For example, when a flow of dry air of about 200 sccm is mixed with argon at about 1-5% and used for oxidation at 400° C. for about 30 seconds, the resulting surface is believed to be excessively oxidized. Instead of forming a rough surface with multiple nucleation sites, a resulting over-oxidized surface has a golden color and results in nucleation of very few silicide nanowires. Similarly, an insufficiently oxidized surface may not provide sufficient nucleation sites. As such, oxidation conditions may be optimized for each metal containing source material and the structures containing these materials.

The process 500 may proceed with the formation of silicide nanostructures (block 506). In certain embodiments, a substrate is introduced into a CVD chamber. It should be noted that other operations, such as treatment operation 104 and/or active material formation operation 508, may be performed in the same chamber. A silicon containing precursor, such as silane, is then flowed into the chamber at a rate of, for example, between about 10 sccm and 300 sccm. These flow rate values are provided for the STS MESC Multiplex CVD system available from Surface Technology Systems in the United Kingdom, which can process substrates up to about 4 inches in diameter. However, one having ordinary skill in the art would understand that other CVD systems may be used. The volumetric concentration of silane in the carrier gas may be less than about 10% or, more specifically, less than about 5%, or even less than about 1%. In particular embodiments, the concentration of silane is about 1%. A process gas may also include one or more carrier gases, such as argon, nitrogen, helium, hydrogen, oxygen (although typically not with silane), carbon dioxide, and methane. During silicide deposition, the substrate may be maintained at a temperature of between about 350° C. and 500° C. or, more specifically, between about 385° C. and 450° C. The chamber pressure may be between about 0.1 Torr and atmosphere pressure or, more specifically, between about 50 Torr and 300 Torr. The duration of deposition may be between about 1 minute and 60 minutes or, more specifically, between about 5 minutes and 15 minutes.

In certain embodiments, process conditions may be varied during the same deposition cycle. For example, silane may be introduced initially at a relatively high concentration in order to promote the nucleation of silicide nanostructures. The silane concentration may be then reduced (e.g., towards the end of the silicide deposition operation) when further nanowire growth is limited by metal diffusion from the rooted ends of the nanowires towards the growing tips. Further, the substrate temperature may initially be kept low and then increased in order to promote such metal diffusion. Overall, process conditions may be varied to control physical properties, e.g., length, diameter, shape, orientation of template structures. Furthermore, morphological properties of template structures, such as stoichiometric phases, crystalline/amorphous phases, and distribution of materials along the height of the template, may be controlled by varying process conditions. Other process conditions to be considered are composition of the gas mixture, flow rates, flow patterns, chamber pressure, substrate temperature, and electric field characteristics. In certain embodiments, process conditions (e.g., temperature, pressure, and silane concentration) are adjusted to promote sidewall deposition of amorphous silicon or deposition of silicon particles onto the silicide structures once they have nucleated. Conditions that could be changed may include process temperature, pressure, and silane concentration.

The chosen process conditions are generally dictated by the metal containing source material as well as by the size, morphology, and composition of the desired structures. For example, the deposition conditions described above can be used to grow nickel silicide nanowires that, on average, are between about 0.5 micrometers and 50 micrometers in length and between about 10 nanometers and 100 nanometers in diameter. A nickel source material layer that is at least about 20 nanometers thick may be sufficient to grow such nickel silicide structures.

In general, silicide nanowires may between about 5 nanometers and 100 nanometers in diameter (i.e., prior to depositing active material) or, more specifically, between about 10 nanometers and 50 nanometers. Further, nanowires may be between about 1 micrometer and 100 micrometers long or, more specifically, between about 5 micrometers and 50 micrometers long and even between about 12 micrometers and 30 micrometers. Without being restricted to any particular theory, it is believed that silicide nanowire length may be limited by the diffusion of metal from the substrate to the growing tip. While such length may provide an adequate surface area for active material deposition, certain techniques may be used to further elongate the silicide nanowires. In certain embodiments, an intermediate layer with a silicon containing material is introduced between the base substrate and the metal containing source material layer. A silicon intermediate layer can provide an alternate (or additional) source of silicon in close proximity to the root of growing nanostructures, which may aid the nucleation and growth process. It has been found that silicide structures grown from nickel deposited on a silicon wafer nucleate much more uniformly and grow more rapidly. In certain embodiments, an intermediate layer includes a metal dopant that diffuses when silicon reacts with metal and also increases the conductivity of the resulting silicide. The dopant can be deposited or even implanted, particularly if provided in a relatively low quantity. In some cases, nitrogen is used to dope nickel silicide.

In another embodiment, after forming an initial silicide template, an additional metal containing source material may be introduced (e.g., sputtered onto the initial template), and silicide formation operation 506 is repeated. In other words, the initial silicide template becomes a new substrate for another silicide template that is deposited over it and so on. In this example, depositing another template may provide additional cross-linking in the initial templates, thereby helping with mechanical and electrical integrity. Additional examples and details of templates and electrodes are provided in U.S. patent application Ser. No. 13/114,413, entitled "MULTIDIMENSIONAL ELECTROCHEMICALLY ACTIVE STRUCTURES FOR BATTERY ELECTRODE," filed on May 24, 2011, and U.S. patent application Ser. No. 13/277,821, entitled "BATTERY ELECTRODE STRUCTURES FOR HIGH MASS LOADINGS OF HIGH CAPACITY ACTIVE MATERIALS," filed on Oct. 20, 2011, both of which are incorporated herein by reference in their entirety for purposes of describing templates and electrodes.

Silicide nanowires are typically substrate rooted by virtue of growing from a metal containing material provide on the substrate. Certain details of substrate rooted structures are described in U.S. patent application Ser. No. 12/437,529 entitled "ELECTRODE INCLUDING NANOSTRUCTURES FOR RECHARGEABLE CELLS" filed on May 7, 2009, which is incorporated herein by reference in its entirety for purposes of describing substrate rooted structures. However, compared to some VLS grown nanowires described in that patent application, the silicide nanowires described herein may form stronger mechanical bonds with the substrate and have lower contact resistance. It is believed that a variable material composition and wider substrate rooted ends may contribute to this result.

It was found that silicide nanowires, when fabricated as described herein, generally have a variable material composition along their lengths. Nanowires have a higher concentration of metal near the substrate rooted ends, where more metal is available, than near the free (distal) ends. Depending on the metal type, this variability may result in different morphological and stoichiometric phases of silicides. For example, a nickel silicide nanowire may include one, two, or all three phases of nickel silicide (i.e., $Ni_2Si$, $NiSi$, and $NiSi_2$). It is believed that phases with higher nickel content form stronger bonds with nickel metal. Therefore, this variability may strengthen the nickel silicide nanowires adhesion to the substrate and reduce the contact resistance. Metal content variability may also cause differences in physical properties along the nanowires' length.

In particular embodiments, substrate rooted ends with the high nickel content are wider and have higher surface roughness. This provides greater contact area with the substrate, improves adhesion, and reduces contact resistance. Strong bonds between the substrate and nanowires help to preserve this attachment, particularly during cell cycling when the active material deposited onto nanowires swells and contracts and may push the nanowires in various directions. Finally, in certain embodiments, silicide nanowires do not experience lithiation during cycling.

Cone shaped nanowires, as described above, may result from a greater availability of metal near the substrate rooted ends of the nanowires. In certain embodiments, an average diameter near the substrate rooted ends is at least about twice that of an average diameter near the free end (based on a comparison of cross sections at each end of the nanowire, with each cross section is taken at a distance from the nanowire end that is about 10% of the total nanowire length). In other words, even if the bases are large enough to touch each other on the surface of the substrate, the tips are free and apart as a result of a decrease in diameter along the structure from the base to the tip. In more specific embodiments, a ratio of the two diameters is at least about 4 or, even more specifically, at least about 10 (representing wider base cones).

Silicide nanowires may interconnect with other nanowires, for example, when one nanowire crosses its path with another nanowire during their growth. Further, additional cross-linking may be provided after depositing silicide nanowires. For example, another template may be deposited over the first one, as described above. A conductive additive (e.g., carbon black, metallic particles) may be introduced among the nanowires. Nanowires may be reshaped after deposition to form more contact points among nanowires, for example, by compressing and/or annealing the silicide template. Finally, additional interconnections may occur during deposition of the active material. For example, two closely spaced silicide nanowires may be coated with an active material such that the active material layers formed on the adjacent nanowires overlap. In a specific embodiment, forming a template is performed in a process chamber maintained at a pressure of about 50 Torr. The process gas contains about 1% of silane. The substrate is kept at about 450° C.

It should be noted that while the references in this document are generally made to a template including nanowires, the template may include other types of structures. Further, wire-based templates may include wires that have an average diameter greater than 1 micrometer. Such templates may be used to deposit a layer of high capacity active material such that the layer itself has nano-scale dimensions irrespective of the template dimensions. However, templates made from nanostructures, such as nanowires, generally provide greater surface area for deposition of the high capacity active material per unit area of the substrate.

After formation of the template but before depositing the active material, the template may be additionally processed to mask certain areas of the template in order to prevent or minimize deposition of active material in these areas. As described above, it is useful to minimize mechanical distortions, such as active material swelling and contraction near the substrate interface to preserve mechanical and electrical bonds between the silicide template and substrate. As such, deposition of the active material near the substrate interface is generally not desirable or, at least, less desirable. Some techniques to profile the thickness and/or composition of the active material layer during deposition are described below with reference to active material formation operation 508. Further, additional materials may be deposited onto the substrate interface after formation of the template. It should be noted that such materials may be deposited in addition, or instead of, intermediate layers provided prior to formation of the template, which are described above. To distinguish the two materials, the material deposited after formation of the template is referred to as a "passivation material" because it may be used, in certain embodiments, to passivate the substrate surface and reduce formation of the active material on this surface.

Figure 3E:
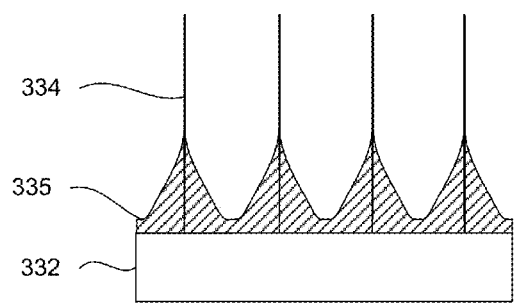

FIG. 3E is a schematic representation of uncoated silicide structures 334 with a passivation material 335. The passivation material 335 near the substrate 332 coats the substrate rooted ends of the silicide structures 334 while the free ends remain uncoated. The passivation material 335 may be deposited during a separate operation or during the initial stages of active material deposition. For example, self-assembling zinc oxide and silicon oxide particles may be introduced into the template. The distribution of the passivation material 335 within the template may be provided by electrodeposition.

Figure 3F:
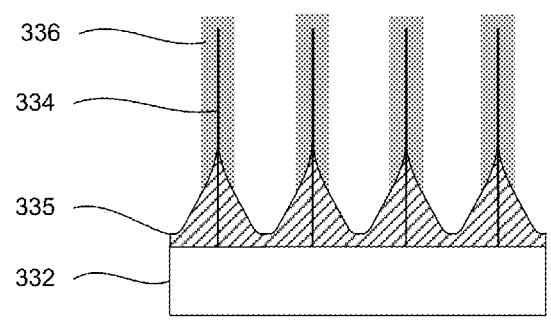

FIG. 3F is a schematic representation of silicide structures 334 coated with an active material 336 such that the passivation material 335 prevented deposition of the active material 336 near the bases of the silicide structures 334. As such, there is little or no mechanical distortion at the substrate 332 during cycling of the electrode, and the connection between the silicide structures 334 and the substrate 332 is more robust.

In certain embodiments, an intermediate layer is deposited over a template structure before deposition of the electrochemically active material. This intermediate layer may include titanium, copper, iron, nickel, nickel titanium, chromium or other similar materials. Materials may be deposited using electroplating, sputtering, or evaporation techniques. Without being restricted to any particular theory, it is believed that a presence of an intermediate layer at this interface increases metallurgical alloying with the active material and better adhesion. Further, some of these materials may act as adhesion promoters and oxygen getters. Finally, alloys such as nickel titanium, copper-zinc-aluminum-nickel, and copper-aluminum-nickel may be used for their elastic properties to provide an interface layer between a relatively dynamic active material layer (which swells and contracts during cycling) and a relatively static template layer. In one embodiment of the invention, the intermediate layer has a thickness between about 2 nanometers and 2 micrometers.

Returning to FIG. 5, the process 500 continues with formation of a high capacity electrochemically active material over the metal silicide template (operation 508). Examples of electrochemically active materials include silicon containing materials (e.g., crystalline silicon, amorphous silicon, other silicides, silicon oxides, sub-oxides, oxy-nitrides), tin containing materials (e.g., tin, tin oxide), germanium, carbon containing materials, a variety of metal hydrides (e.g., $MgH_2$), silicides, phosphides, and nitrides. Other examples include: carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon). Examples of positive electrochemically active materials include various lithium metal oxides (e.g., $LiCoO_2$, $LiFePO_4$, $LiMnO_2$, $LiNiO_2$, $LiMn_2O_4$, $LiCoPO_4$, $LiNi_{1/3}CO_{1/3}Mn_{1/3}O_2$, $LiNi_xCo_yAl_zO_2$, $LiFe_2(SO_4)_3$, $Li_2FeSiO_4$, $Na_2FeO_4$), carbon fluoride, metal fluorides such as iron fluoride ($FeF_3$), metal oxide, sulfur, and combinations thereof. Doped and non-stoichiometric variations of these positive and negative active materials may be used as well. Examples of dopants include elements from the groups III and V of the periodic table (e.g., boron, aluminum, gallium, indium, thallium, phosphorous, arsenic, antimony, and bismuth) as well as other appropriate dopants (e.g., sulfur and selenium). In certain embodiments, a high capacity active material includes amorphous silicon. For example, a layer of amorphous silicon may be deposited over a nickel silicide template.

High capacity active materials may be doped during or after the deposition operation. Dopants can be used to improve conductivity of the active material and to perform other functions. For example, phosphine ($PH_3$) may be added to the process gas to provide phosphorous doping of silicon or other active materials. In specific embodiments, such as some embodiments employing silane in the process gas, the concentration of phosphine or another dopant carrying component in the process gas may be at least about at least about 0.1% (based on its partial pressure), or at least about 0.5%, or even at least about 1%. Dopants can be also introduced into the active layer after deposition of the active material (e.g., by sputtering, electroplating, ion implantation, and other techniques). In certain embodiments, a lithium containing compound is deposited onto the active material. The additional lithium may be used in a lithium ion cell to offset losses associated with solid electrolyte interface (SEI) layer formation and/or to keep some remaining lithium present in the negative active material even during a complete cell discharge. Retaining some lithium in the negative electrode may help to improve the negative active material conductivity and/or avoid certain morphological changes in the negative active material at the end of the discharge portion of the cycle.

In certain embodiments, multiple different active materials (e.g., high capacity active materials such as tin) may be deposited over the template. In one example, a layer of silicon may be further coated with a carbon layer to form a core-shell structure. In this example, the silicide nanostructure of the template serves as a core, the silicon layer as an intermediate layer or outer core, and the carbon layer as a shell. Other examples include coatings that include materials that are not necessarily electrochemically active but that are configured to perform other functions in the electrode, such as promoting the formation of a stable SEI layer. Examples of such materials include carbon, copper, polymers, sulfides, and metal oxides.

In specific embodiments, an active material layer is deposited as a combination of germanium and silicon. The distribution of these two materials varies along the height of the template, such that more germanium is deposited near the substrate interface than near the free ends, and vice versa for silicon. Germanium lithiates much less than silicon and, as a result, germanium exhibits much less swelling. At the same time, a morphological structure of germanium (e.g., its lattice) matches well to that of silicon. Less swelling, in turn, helps to reduce stress at the substrate, thereby resulting in more robust electrode structures and cells with improved cycling performance.

The CVD process to form a variable composition active material layer may start with introducing a process gas containing an initial concentration of the germanium containing precursor and an initial concentration of the silicon containing precursor. The concentration of the germanium containing precursor is then decreased, while the concentration of the silicon containing precursor is increased as deposition continues.

High capacity active materials may be deposited using CVD techniques, electroplating, electroless plating, or solution deposition. In some embodiments, they are deposited in a manner similar to that employed to grow the silicide structures. Both silicides and active materials may be deposited in the same chamber. More specifically, the same chamber may be also used for the substrate treatment.

In certain embodiments, active materials may be deposited using a plasma enhanced chemical vapor deposition (PECVD) technique. This technique will now be described in more detail with reference to an amorphous silicon layer doped with phosphorous. However, it should be understood that this or similar techniques may be used for other active materials as well. A substrate containing a silicide template, more specifically a nickel silicide template, is provided in a PECVD chamber. The substrate is heated to between about 200° C. and 400° C. or, more specifically, between about 250° C. and 350° C. A process gas containing a silicon containing precursor (e.g., silane) and one or more carrier gases (e.g., argon, nitrogen, helium, hydrogen, oxygen, carbon dioxide, and methane) is introduced into the chamber. In a specific example, a concentration of silane in helium is between about 5% and 20% or, more specifically, between about 8% and 15%. The process gas may also include a dopant containing material, such as phosphine, at a concentration of between about 1% and 5%. The chamber pressure may be maintained at between about 0.1 Torr to 10 Torr or, more specifically, at between about 0.5 Torr and 2 Torr. To enhance silane decomposition, a plasma is ignited in the chamber.

The following process (i.e., Radio Frequency (RF) power and flow rates) parameters are provided for an STS MESC Multiplex CVD system available from Surface Technology Systems in United Kingdom, which can process substrates up to about 4 inches in diameter. It should be understood by one having ordinary skill in the art that these process parameters can be scaled up or down for other types of chambers and substrate sizes. The RF power may be maintained at between about 10 W and 100 W and the overall process gas flow rate may be kept at between about 200 sccm and 1000 sccm or, more specifically, at between about 400 sccm and 700 sccm.

In a specific embodiment, forming a layer of the electrochemically active material is performed in a process chamber maintained at a pressure of about 1 Torr. The process gas contains about 50 sccm of silane and about 500 sccm of helium. In order to dope the active material, about 50 sccm of 15% phosphine may be added to the process gas. The substrate is kept at about 300° C. The RF power level is set to about 50 W. In certain embodiments, a pulsed PECVD method is employed.

To achieve an adequate thickness of the active material, deposition may be performed for between about 0.5 minutes and 30 minutes. A thickness of the active material may be driven by energy density requirements, material properties (e.g., theoretical capacity, stress fracture limits), template surface area, and other parameters. In certain embodiments, a layer of amorphous silicon that is between about 50 nanometers and 500 nanometers thick or, more specifically, between about 100 nanometers and 300 nanometers thick, is deposited. It should be noted that this layer is deposited on silicide nanowires having diameters of between about 10 nanometers and 100 nanometers. Therefore, an average diameter of the resulting structure (i.e., silicide nanowires with an active material layer deposited over the nanowires) may be between about 100 nanometers and 1,100 nanometers. Other dimensions may be possible as well. For example, an amorphous silicon layer thicker than about 500 nanometers is possible by increasing porosity of the layer. In certain embodiments, a porous silicon layer may be between about 500 nanometers and 1000 nanometers thick or, more specifically, between about 500 nanometers and 750 nanometers thick. Some examples and details of porous active material structures are provided in U.S. patent application Ser. No. 13/277,620, entitled "COMPOSITE STRUCTURES CONTAINING HIGH CAPACITY POROUS ACTIVE MATERIALS CONSTRAINED IN SHELLS" filed on Oct. 22, 2011, which is incorporated herein by reference in its entirety for purposes of describing porous active material structures.

It has been determined that some active material layers having thicknesses of between about 50 nanometers and 500 nanometers can be typically deposited within 10-20 minutes. Another way to characterize an amount of the deposited active material is relative to the underlying template. In certain embodiments, a mass ratio of the active material volume to the metal silicide volume is at least about 10 or, more specifically, at least about 100. As described in other parts of this document, this ratio may vary significantly along the height of the template. Specifically, this ratio may be substantially less near the substrate interface than near the free ends of the individual structures.

Figure 5A:
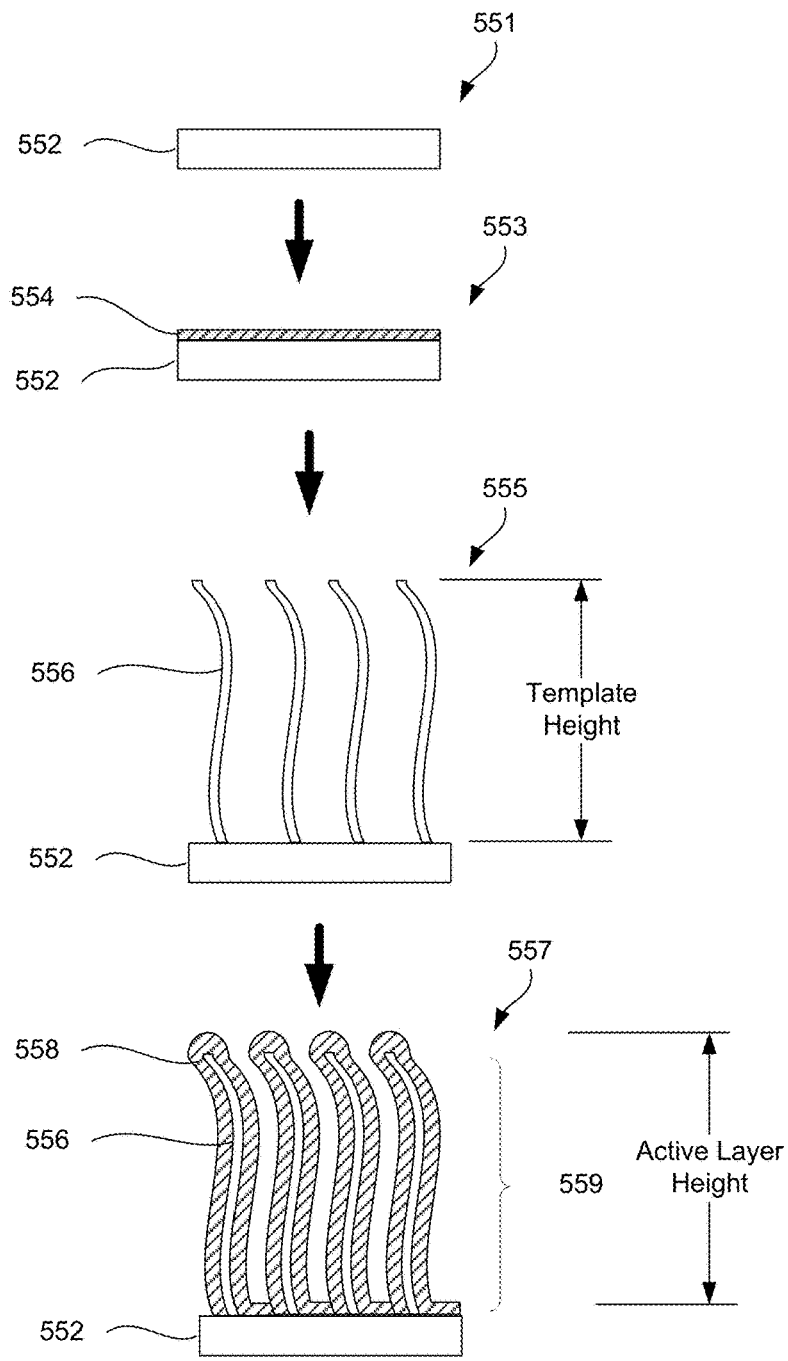
FIG. 5A presents schematic representations of four examples of structures that are produced during different stages of the process illustrated in FIG. 5 according to certain embodiments.

FIG. 5A illustrates four examples of the structures that are produced during different stages of the overall process explained above. A substrate 552 may be initially provided during an initial stage 551. As explained above, a substrate 552 may include a base substrate material and a metal source material (used to form silicide). Various examples and combinations of these materials are described above. The substrate 552 may be then treated to form a surface 554 that is suitable to form silicide nanostructures (stage 553). If the substrate 552 is a foil, surface 554 may be formed on both sides of the foil (not shown). In some examples, surface 554 includes specific nucleation sites for forming nanowires. Surface 554 may also include masking materials. Silicide nanostructures 556 are then formed on the substrate 552 (stage 555). In certain embodiments, silicide nanostructures 556 have their ends rooted to the substrate 552. Silicide nanostructures form a high surface area template that is used for depositing an active material. Finally, an active material layer 558 is deposited over the silicide nanostructures 556 (stage 557). Silicide nanostructures 556 can provide both mechanical support to the active material 558 and electrical connection to the substrate 552.

A combination of the silicide nanostructures 556 and the active material 558 may be referred to as an active layer 559, which is adjacent to substrate 552. Overall, active layer 559 may be characterized by its height, which is typically close to the height of the silicide template or the length of the nanowires making this template. In certain embodiments, a height of the active layer is between about 10 micrometers and 50 micrometers or, more specifically, between about 20 micrometers and 40 micrometers. An electrode having a substrate and two active layers deposited on the two opposite sides of the substrate may have a height of between about 50 micrometers and 100 micrometers. Furthermore, active layer 559 may be characterized by its porosity (e.g., at least about 25% or, more specifically, at least about 50% or, even more specifically, at least about 75%), its capacity per unit area, and other characteristics.

Further, the thickness of the active material coating the template may vary along the height of the template. For example, an active material layer may be thicker near the free ends of the structures than near the substrate interface. FIG. 4 illustrates an example of such an active material layer 410 deposited over template structures 406 arranged on a substrate 402. Without being restricted to any particular theory, it is believed that such distribution of the active material can be achieved by certain process conditions resulting in a mass transport limiting regime. This regime results in a concentration gradient of the active material precursor species (e.g., silane) along the height of the template and higher deposition rates near the free ends of the structures than near the substrate interface. Such active material distribution may be beneficial from a electrochemical cycling perspective because the substrate rooted ends of the structures will experience less swelling and stress during lithiation, thereby preserving contact between the structures and the substrate.

Specifically, uneven distribution of the active material may be achieved by performing CVD deposition at relative high pressure levels inside the deposition chamber. Without being restricted to any particular theory, it is believed that a shorter mean free path is achieved at higher pressure levels, which, in turn, leads to high faster deposition rates and rapid consumption of the active material precursors near the free ends of the structures. This effectively creates a mass transport limiting regime over the height of the template. For example, deposition may be performed at between about 50 Torr and 760 Torr, more specifically at between about 100 Torr and 600 Torr or, even more specifically, between about 200 Torr and 600 Torr. In a particular example, deposition is performed at about 600 Torr. Deposition temperatures may be between about 400° C. and 600° C. or, more specifically, between about 450° C. and 550° C. In a particular example, deposition is performed at about 500° C. These temperature ranges are presented for a thermal CVD technique. If a PECVD technique is used for deposition, the temperatures may be in the range of between about 200° C. and 450° C. Silane concentration in argon or hydrogen may range between about 0.5% and 20% or, more specifically, between about 0.5% and 10% or, even more specifically, between about 1% and 5%.

Another approach is to perform a deposition using a PECVD technique at a low temperature. PECVD creates localized radicals that have a shorter lifetime than thermally excited radicals. Therefore, the mean free path is believed to be shorter and deposition becomes less conformal, which provides more deposition at the top of the template where the radical concentration is greater. Also, PECVD allows deposition at lower temperatures, as was mentioned above. Lower temperatures help reduce side reactions with the substrate and the forming of an unwanted excess of silicides at the substrate interface that may become brittle. A PECVD deposition may be performed at pressure levels of between about 1 Torr and 50 Torr, temperature ranges of between about 200° C. and 450° C., and a concentration of silane of between about 1% and 20% in hydrogen, helium, nitrogen, argon, or various combinations thereof. Plasma inside the chamber may be biased to provide more desirable distribution of the reactive species.

Furthermore, a remote plasma generator may be used to create activated species from the active material precursors, such as ions and radicals. The activated species (e.g., $^{-2}SiH_2$) are more reactive that their un-activated counterparts (e.g., $SiH_4$) and tend to be consumed faster at the free ends of the structures, thereby effectively creating a mass transport limiting regime. Some examples of the remote plasma generators include ASTRON® i Type AX7670, ASTRON® e Type AX7680, ASTRON® ex Type AX7685, ASTRON® hf-s Type AX7645, which are all available from MKS Instruments of Andover, Mass. The generator is typically a self-contained device generating ionized plasma using the supplied active material precursors. The generator also includes a high power RF generator for supplying energy to the electrons in the plasma. This energy may then be transferred to the neutral active material precursor molecules (e.g., silane) causing the temperature of these molecules to rise to a 2000K level and resulting in thermal dissociation of the molecules. The generator may dissociate more than 90% of the supplied precursor molecules because of its high RF energy and special channel geometry that causes the precursors to adsorb most of this energy. The generator may be used by itself (e.g., together with a Thermal CVD chamber) or in a combination with a PECVD reactor, which may provide further dissociation of the species (e.g., species that were recombined in the deliver line and shower head).

Figure 6A:
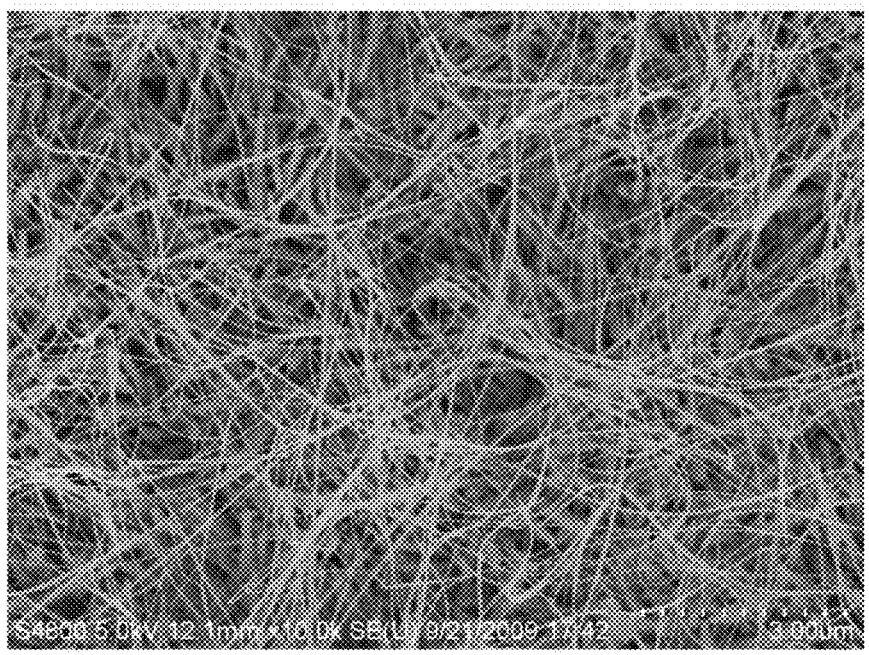
FIG. 6A is an SEM image of a silicide nanowire template as viewed from above.

FIG. 6A is an SEM image of a silicide nanowires template as viewed from above. These nanowires were deposited directly onto a hard rolled nickel foil available from Carl Schlenk AG Company in Roth, Germany. The foil was first oxidized for 1 min at 300° C. in a process chamber containing air at a pressure of 50 Torr. The foil was then heated to 650° C. and a process gas containing 1% by volume of silane was introduced into the chamber for 10 minutes. Resulting silicide nanowires were about 10-50 nanometers in diameter and about 1-30 micrometers in length. The density of the nanowires was between about 10-70%. As can be seen in the SEM image, the nanowires form a very high surface area template.

Figure 6B:
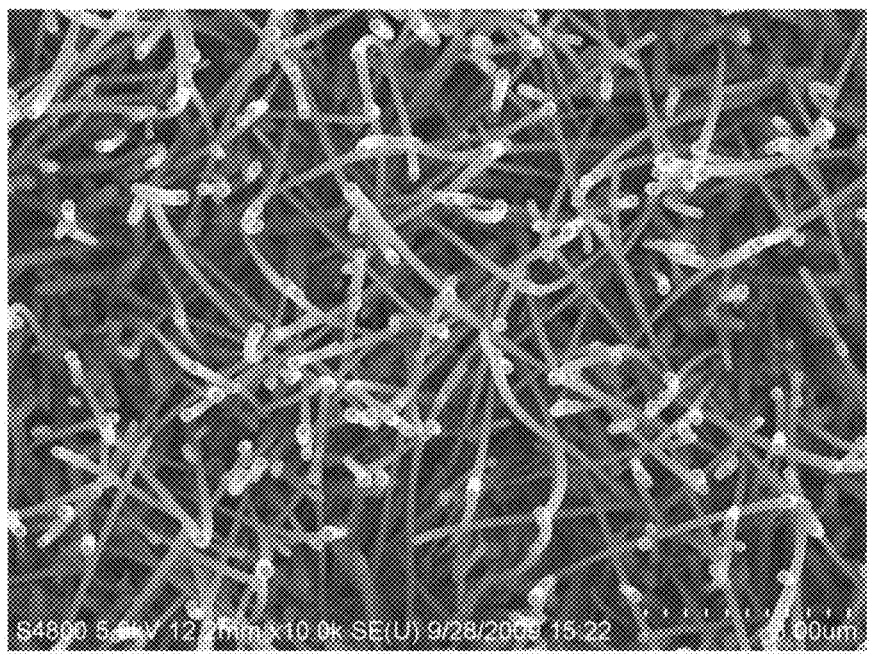
FIG. 6B is an SEM image of a silicide nanowire template coated with amorphous silicon.

FIG. 6B is an SEM image of the nanowire template coated with amorphous silicon. The image was taken from the same direction as was FIG. 6A. The initial silicide template used for depositing the silicon is the same as in FIG. 6A. Amorphous silicon deposition was performed at 300° C. and 1 Torr for 10 minutes. The process gas included 50 sccm of 100% silane, 500 sccm of helium, and 50 sccm of 15% by volume phosphine. The RF power was 50 W. The average diameter of the coated nanowires was estimated to be 271-280 nanometers. The SEM images of both FIGS. 6A and 6B are provided at the same magnification to illustrate the relative sizes of the uncoated template nanowires (in FIG. 6A) and the amorphous silicon structure formed over these nanowires (in FIG. 6B). As can be seen from the two SEM images, the amorphous silicon structures are substantially thicker than the uncoated silicide nanowires.

Figure 6C:
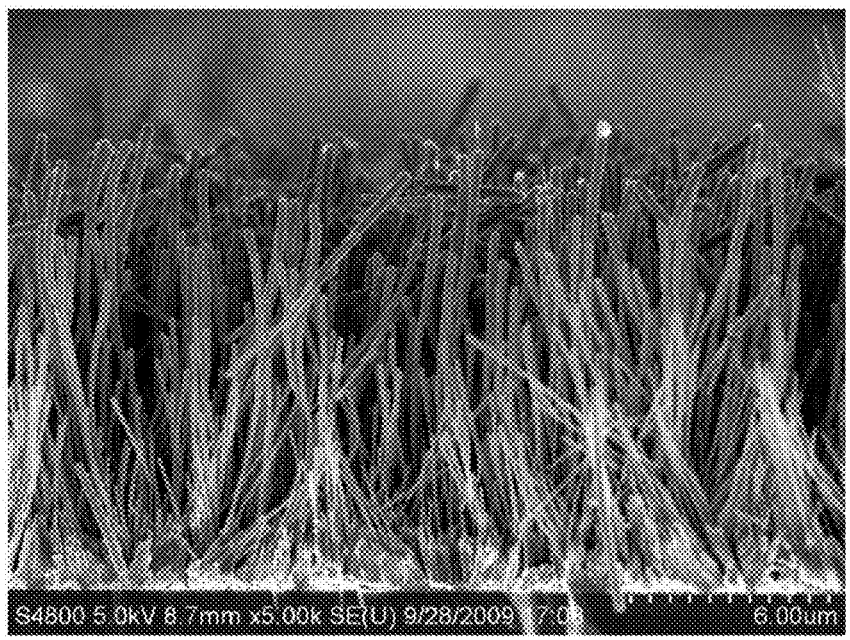
FIG. 6C is a side view SEM image of the active layer containing silicon coated nanowires.

FIG. 6C is a side view SEM image of the active layer containing silicon coated nanowires similar to the ones in FIG. 6A. The nanowires have a relatively high aspect ratio even after being coated with the active material. The height of the active layer is generally defined by the length of the nanowires. Further, an active layer has a relatively high porosity, which allows the nanowires to swell during lithiation without generating excessive stresses in the active layer and breaking each other. The porosity also allows electrolyte components to freely migrate through the active layer.

Figure 6D:
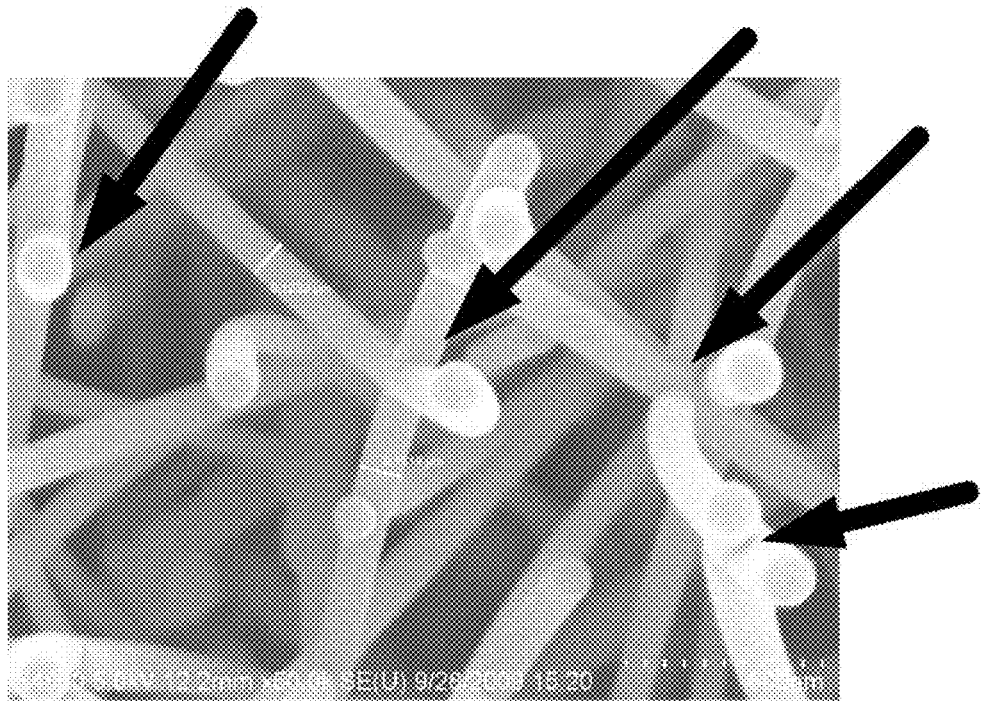
FIG. 6D is a higher magnification SEM image of the active layer shown in FIG. 6B.

FIG. 6D illustrates a higher magnification SEM image of the active layer originally presented in FIG. 6B. Black arrows point to contact points (sometimes referred to herein as "interconnections") between the nanowires. Such interconnections could have formed during deposition of the nickel silicide nanowires and/or coating the nanowires with amorphous silicon. As indicated above, such interconnections enhance mechanical strength and electrical conductivity of the active layer.

Figure 6E:
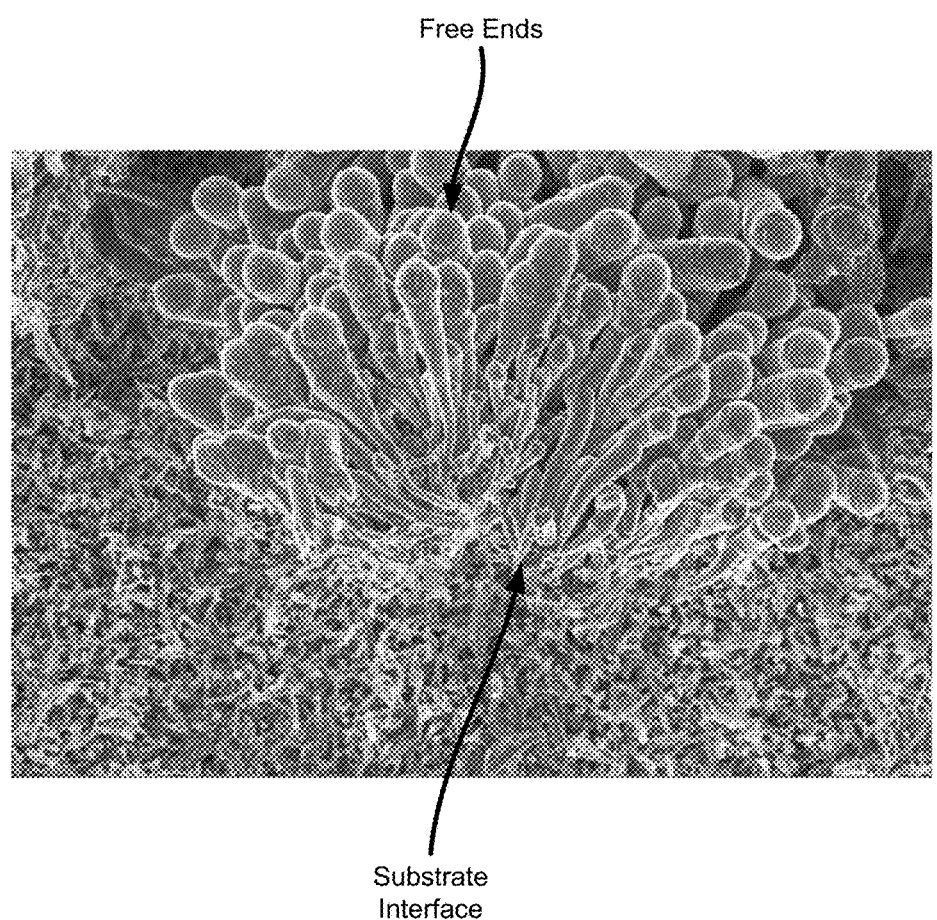
FIG. 6E is an SEM image obtained at an angle with respect to the top surface of an electrode and showing free ends and substrate-rooted ends of nanowires.

FIG. 6E is an SEM image obtained at an angle with respect to the top surface of the electrode and illustrating nanowires being much thicker at their free ends than at their substrate-rooted ends. The active material structures forming this electrode have much thicker free ends than substrate interface ends. Such structures are schematically illustrated in FIG. 4 and described above. It has been estimated that the structures shown in FIG. 6E have free ends that are about 1 micrometer in diameter, while the substrate rooted ends are about 200 nanometers in diameter. The length of the structures was estimated to be about 12-20 micrometers.

Electrode Arrangements (General)

Figure 7A:
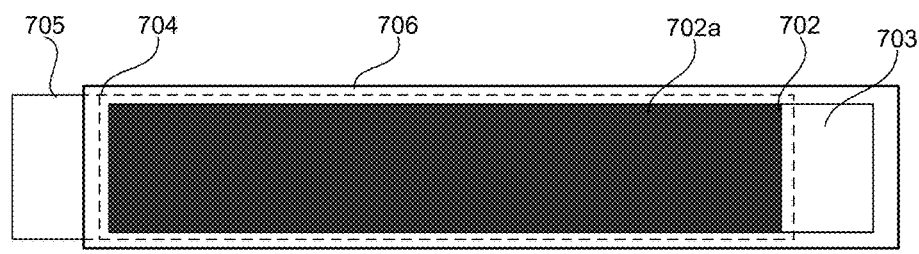
FIG. 7A is schematic representation of a plan view of a partially-assembled electrochemical cell that uses electrodes described herein, according to certain embodiments.

FIG. 7A is a plan view of a partially-assembled electrochemical cell that uses electrodes described herein, according to certain embodiments. The cell has a positive electrode active layer 702 that is shown covering a major portion of a positive current collector 703. The cell also has a negative electrode active layer 704 that is shown covering a major portion of a negative current collector 705. Separator 706 is between the positive electrode active layer 702 and the negative electrode active layer 704.

In one embodiment, the negative electrode active layer 704 is slightly larger than the positive electrode active layer 702 to ensure trapping of the lithium ions released from the positive electrode active layer 702 by the active material of the negative electrode active layer 704. In one embodiment, the negative electrode active layer 704 extends at least between about 0.25 millimeters and 7 millimeters beyond the positive electrode active layer 702 in one or more directions. In a more specific embodiment, the negative electrode active layer 704 extends beyond the positive electrode active layer 702 by between about 1 millimeter and 2 millimeters in one or more directions. In certain embodiments, the edges of the separator 706 extend beyond the outer edges of at least the negative electrode active layer 704 to provide the complete electronic insulation of the negative electrode from the other battery components.

Figure 7B:
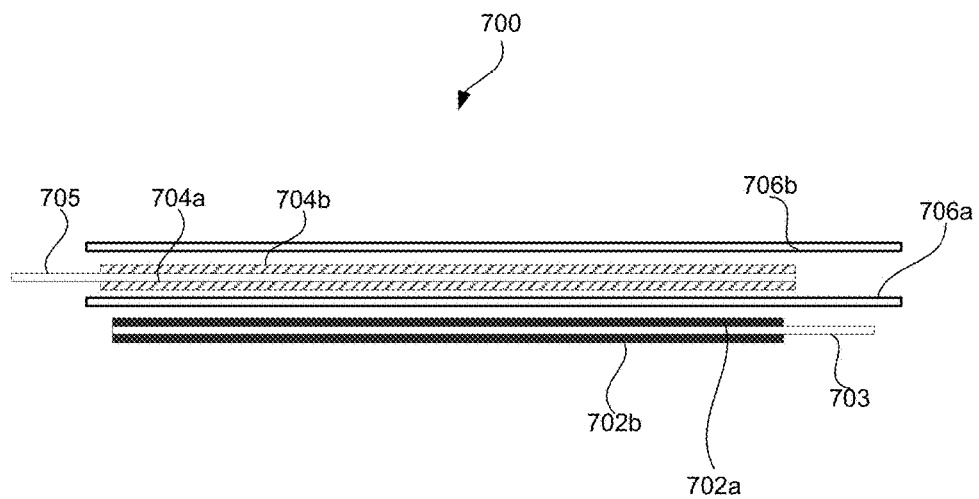
FIG. 7B is schematic representation of a cross-sectional view of an electrode stack of a partially-assembled electrochemical cell that uses electrodes described herein, according to certain embodiments.

FIG. 7B is a cross-section view of an electrode stack 700 of the partially-assembled electrochemical cell that uses electrodes described herein, according to certain embodiments. There is a positive current collector 703 that has a positive electrode active layer 702a on one side and a positive electrode active layer 702b on the opposite side. There is a negative current collector 705 that has a negative electrode active layer 704a on one side and a negative electrode active layer 704b on the opposite side. There is a separator 706a between the positive electrode active layer 702a and the negative electrode active layer 704a. The separator sheets 706a and 706b serves to maintain mechanical separation between the positive electrode active layer 702a and the negative electrode active layer 704a and acts as a sponge to soak up the liquid electrolyte (not shown) that will be added later. The ends of the current collectors 703, 705, on which there is no active material, can be used for connecting to the appropriate terminal of a cell (not shown).

Together, the electrode layers 702a, 704a, the current collectors 703, 705, and the separator 706a can be said to form one electrochemical cell unit. The complete stack 700 shown in FIG. 7B, includes the electrode layers 702b, 704b and the additional separator 706b. The current collectors 703, 705 can be shared between adjacent cells. When such stacks are repeated, the result is a cell or battery with larger capacity than that of a single cell unit.

Figure 8A:
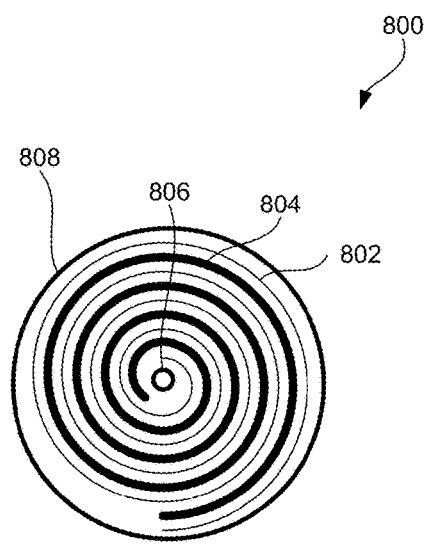
FIGS. 8A-8C are schematic representations of various views of electrodes wound together with two sheets of separator to form a cell according to certain embodiments.
Figure 8B:
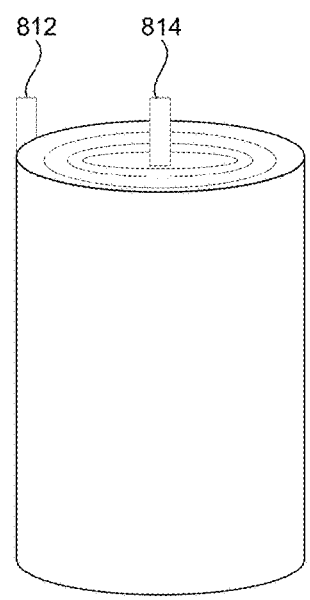

Another way to make a battery or cell with large capacity is to make one very large cell unit and wind it in upon itself to make multiple stacks. The cross-section schematic illustration in FIG. 8A shows how long and narrow electrodes can be wound together with two sheets of separator to form a battery or cell, sometimes referred to as a jellyroll 800. The jellyroll is shaped and sized to fit the internal dimensions of a curved, often cylindrical, case 802. The jellyroll 800 has a positive electrode 806 and a negative electrode 804. The white spaces between the electrodes are the separator sheets. The jelly roll can be inserted into the case 802. In some embodiments, the jellyroll 800 may have a mandrel 808 in the center that establishes an initial winding diameter and prevents the inner winds from occupying the center axial region. The mandrel 808 may be made of conductive material, and, in some embodiments, it may be a part of a cell terminal. FIG. 8B shows a perspective view of the jelly roll 800 with a positive tab 812 and a negative tab 814 extending from the positive current collector (not shown) and the negative current collector (not shown), respectively. The tabs may be welded to the current collectors.

The length and width of the electrodes depend on the overall dimensions of the cell and thicknesses of the active layers and the current collectors. For example, a conventional 18650-type cell with 18 mm diameter and 85 mm length may have electrodes that are between about 300 and 1000 mm long. Shorter electrodes corresponding to lower rate/higher capacity applications are thicker and have fewer winds.

A cylindrical design may be used for some lithium ion cells especially when the electrodes can swell during cycling and thus exert pressure on the casing. It is useful to use a cylindrical casing that is as thin as possible while still being able to maintain sufficient pressure on the cell (with a good safety margin). Prismatic (flat) cells may be similarly wound, but their case may be flexible so that they can bend along the longer sides to accommodate the internal pressure. Moreover, the pressure may not be the same within different parts of the cell, and the corners of the prismatic cell may be left empty. Empty pockets generally should be avoided within lithium ions cells because electrodes tend to be unevenly pushed into these pockets during electrode swelling. Moreover, the electrolyte may aggregate in empty pockets and leave dry areas between the electrodes, negatively affecting lithium ion transport between the electrodes. Nevertheless, for certain applications, such as those dictated by rectangular form factors, prismatic cells are appropriate. In some embodiments, prismatic cells employ stacks of rectangular electrodes and separator sheets to avoid some of the difficulties encountered with wound prismatic cells.

Figure 8C:
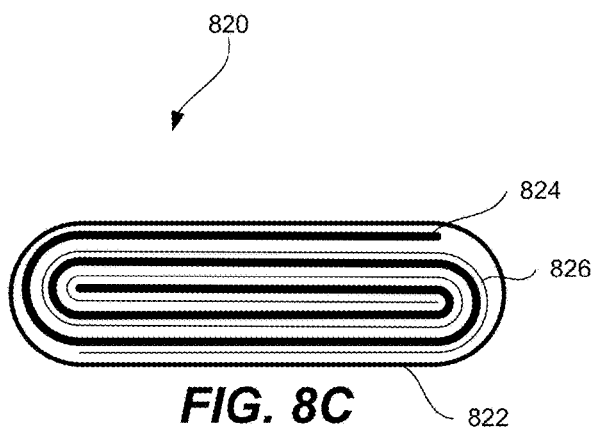

FIG. 8C illustrates a top view of a wound prismatic jellyroll 820. The jellyroll 820 includes a positive electrode 824 and a negative electrode 826. The white space between the electrodes is the separator sheet. The jelly roll 820 is enclosed in a rectangular prismatic case 822. Unlike cylindrical jellyrolls shown in FIGS. 8A and 8B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 9A:
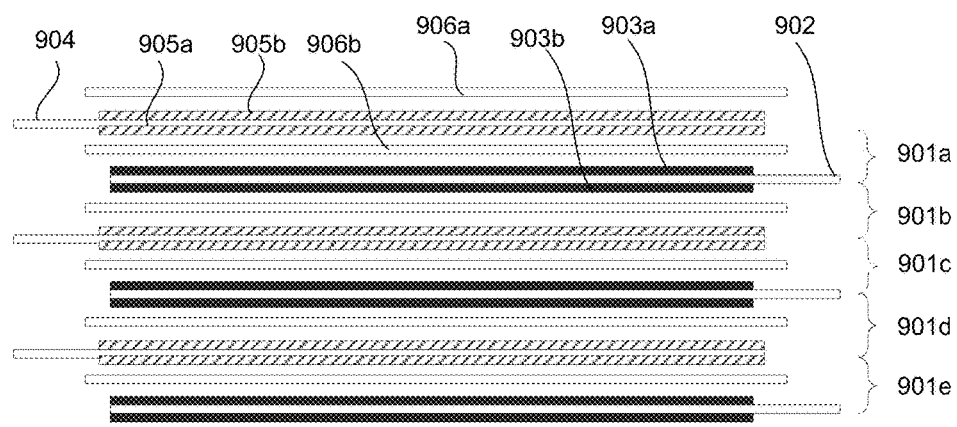
FIGS. 9A and 9B are schematic representations of cross-sectional and perspective views of a stacked cell that includes a plurality of cells according to certain embodiments.
Figure 9B:
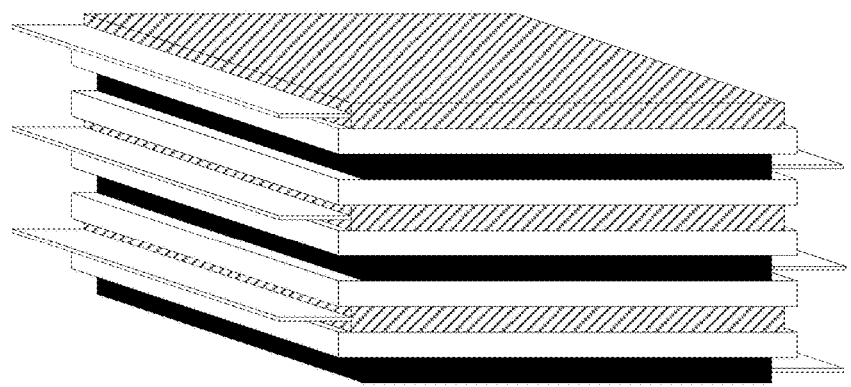

FIG. 9A illustrates a cross-section of a stacked cell that includes a plurality of cells (901a, 901b, 901c, 901d, and 901e), each having a positive electrode (e.g., 903a, 903b), a positive current collector (e.g., 902), a negative electrode (e.g., 905a, 905b), a negative current collector (e.g., 904), and a separator (e.g., 906a, 906b) between the electrodes. Each current collector is shared by adjacent cells. A stacked cell can be made in almost any shape, which is particularly suitable for prismatic batteries. The current collector tabs typically extend from the stack and lead to a battery terminal. FIG. 9B shows a perspective view of a stacked cell that includes a plurality of cells.

Once the electrodes are arranged as described above, the cell is filled with electrolyte. The electrolyte in lithium ions cells may be liquid, solid, or gel. The lithium ion cells with the solid electrolyte are referred to as a lithium polymer cells.

A typical liquid electrolyte comprises one or more solvents and one or more salts, at least one of which includes lithium. During the first charge cycle (sometimes referred to as a formation cycle), the organic solvent in the electrolyte can partially decompose on the negative electrode surface to form a SEI layer. The interphase is generally electrically insulating but ionically conductive, thereby allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combinations thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment, the total concentration of salt in a liquid nonaqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, it may be no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PNMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 10:
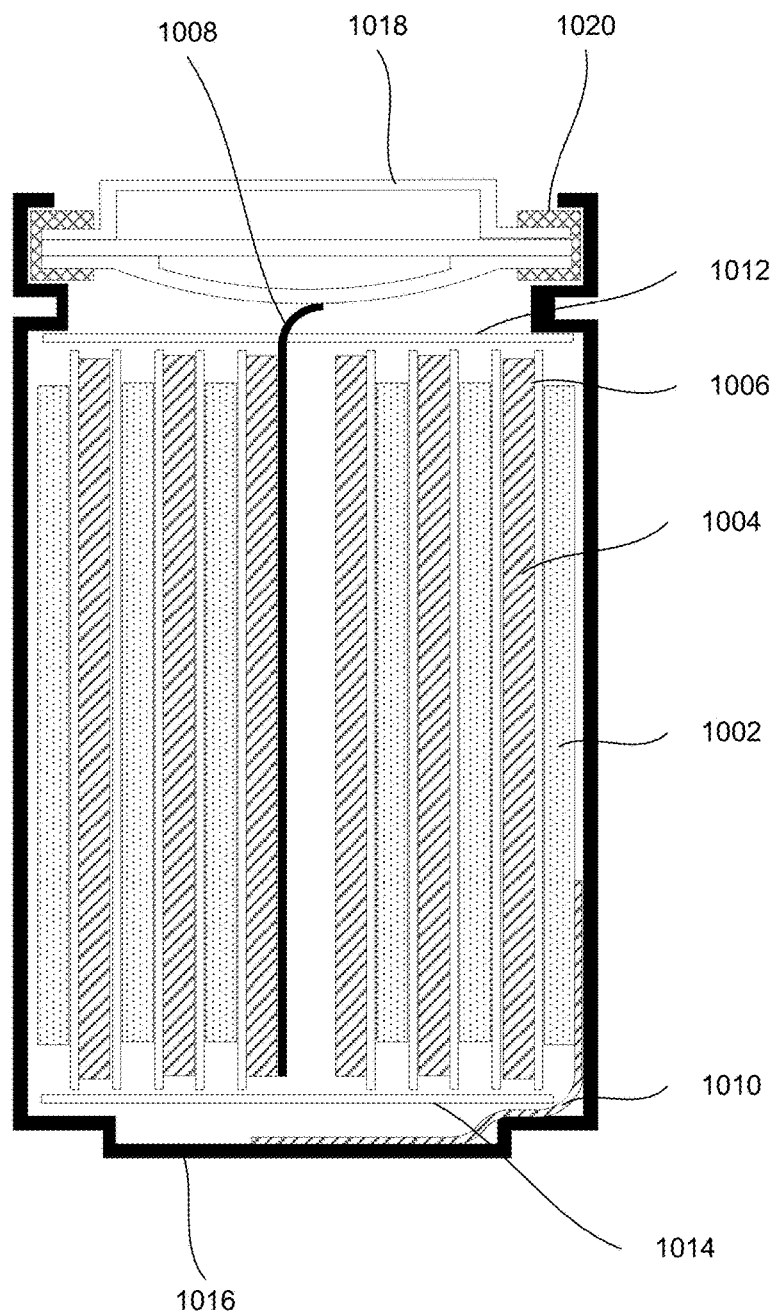
FIG. 10 is schematic representation of cross-sectional view of a wound cylindrical cell, in accordance with certain embodiments.

FIG. 10 illustrates a cross-section view of a wound cylindrical cell, in accordance with one embodiment. A jelly roll comprises a spirally wound positive electrode 1002, a negative electrode 1004, and two sheets of the separator 1006. The jelly roll is inserted into a cell case 1016, and a cap 1018 and gasket 1020 are used to seal the cell. It should be noted that in certain embodiments a cell is not sealed until after subsequent operations. In some cases, cap 1018 or cell case 1016 includes a safety device. For example, a safety vent or burst valve may be employed to open if excessive pressure builds up in the battery. In certain embodiments, a one-way gas release valve is included to release oxygen that has been released during activation of the positive material. Also, a positive thermal coefficient (PTC) device may be incorporated into the conductive pathway of cap 1018 to reduce the damage that might result if the cell suffered a short circuit. The external surface of the cap 1018 may used as the positive terminal, while the external surface of the cell case 1016 may serve as the negative terminal. In an alternative embodiment, the polarity of the battery is reversed and the external surface of the cap 1018 is used as the negative terminal, while the external surface of the cell case 1016 serves as the positive terminal. Tabs 1008 and 1010 may be used to establish a connection between the positive and negative electrodes and the corresponding terminals. Appropriate insulating gaskets 1014 and 1012 may be inserted to prevent the possibility of internal shorting. For example, a Kapton™ film may be used for internal insulation. During fabrication, the cap 1018 may be crimped to the cell case 1016 in order to seal the cell. However, prior to this operation, electrolyte (not shown) is added to fill the porous spaces of the jelly roll.

A rigid case is typically used for lithium ion cells, while lithium polymer cells may be packed into flexible, foil-type (polymer laminate) cases. A variety of materials can be chosen for the cases. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

In addition to the battery applications described above, metal silicides may be used in fuel cells (e.g., for anodes, cathodes, and electrolytes), hetero junction solar cell active materials, various forms of current collectors, and/or absorption coatings. Some of these applications can benefit from a high surface area provided by metal silicide structures, high conductivity of silicide materials, and fast inexpensive deposition techniques.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. An electrode for use in a lithium ion cell, comprising:
a nanostructured template;
an electrochemically active material layer coating the template; and
a first intermediate layer between the nanostructured template and the electrochemically active material layer;
wherein the nanostructured template comprises silicide nanowires.

2. The electrode of claim 1 wherein the electrochemically active material comprises one or more materials selected from the group consisting of silicon, tin, germanium, carbon, metal hydrides, silicides, phosphides, nitrides, and oxynitrides.

3. The electrode of claim 1 wherein the first intermediate layer comprises one or more materials selected from the group consisting of titanium, copper, iron, nickel, and chromium.

4. The electrode of claim 1, wherein the first intermediate layer has a thickness between about 2 nanometers and 2 micrometers.

5. The electrode of claim 1 wherein the first intermediate layer facilitates one or more of:
adhesion between the nanostructured template and the electrochemically active material layer;
electronic conductivity within the electrode; and
stress relaxation between the nanostructured template and the electrochemically active material layer.

6. The electrode of claim 5 wherein the first intermediate layer facilitates adhesion between the nanostructured template and the electrochemically active material layer by forming a compound and/or an alloy with materials in the electrochemically active material layer and/or in the nanostructured template.

7. The electrode of claim 5 wherein the first intermediate layer facilitates electronic conductivity within the electrode by reducing electronic resistance between the nanostructured template and the electrochemically active material layer.

8. The electrode of claim 5 wherein the first intermediate layer facilitates stress relaxation between the nanostructured template and the electrochemically active material layer because the first intermediate layer has elastic properties that allows it to absorb at least some of the stress from expansion and contraction of the electrochemically active material layer without transmitting all the stress to the nanostructured template.

9. The electrode of claim 1, further comprising a substrate that is coated with a second intermediate layer, wherein at least the nanostructured template is in contact with the second intermediate layer.

10. The electrode of claim 9 wherein the second intermediate layer facilitates one or more of:
adhesion between the nanostructured template and the substrate;
electronic conductivity within the electrode; and
stress relaxation between the nanostructured template and the substrate.

11. The electrode of claim 9 wherein the second intermediate layer is the same as the first intermediate layer.

12. An electrode for use in a lithium ion cell, comprising:
a conductive substrate having a first surface;
a nanostructured template on the first surface;
an electrochemically active material layer coating the nanostructured template;
a first intermediate layer between the nanostructured template and the electrochemically active material layer; and
a second intermediate layer between the first surface of the conductive substrate and the nanostructured template;

wherein the nanostructured template comprises silicide nanowires.

13. The electrode of claim 12, wherein the first surface comprises one or more selected from the group consisting of copper, metal oxides, stainless steel, titanium, aluminum, nickel, chromium, tungsten, metal nitrides, metal carbides, carbon, carbon fiber, graphite, graphene, carbon mesh, and conductive polymers.

14. The electrode of claim 12 wherein the conductive substrate comprises a base substrate and a thin metal foil that is attached to the base substrate, wherein the first surface comprises the thin metal foil.

15. The electrode of claim 14 wherein the thin metal foil has a composition that is different from the base substrate.

16. The electrode of claim 2 wherein at least a portion of the electrochemically active material layer further comprises a moderating additive that reduces swelling of the electrochemically active material layer upon lithiation.

17. The electrode of claim 16 wherein the moderating additive has a lithium capacity that is less than the lithium capacity of the electrochemically active material.

18. The electrode of claim 17 wherein the moderating additive has a concentration that varies throughout the electrochemically active material layer.

19. The electrode of claim 18 wherein the moderating additive is selected from the group consisting of oxygen, titanium, tin, germanium, nickel, copper, carbon, nitrogen, aluminum, and tungsten.

20. The electrode of claim 18 wherein the concentration of the moderating additive in the electrochemically active material is highest in regions of the electrochemically active material layer that are adjacent to a conductive substrate.

* * * * *